United States Patent [19]
Weisz

[11] Patent Number: 6,128,621
[45] Date of Patent: Oct. 3, 2000

[54] APPARATUS AND METHOD FOR PICKLING DATA

[75] Inventor: John Weisz, Redwood Shores, Calif.

[73] Assignee: Oracle Corporation, Redwood Shores, Calif.

[21] Appl. No.: 08/961,795

[22] Filed: Oct. 31, 1997

[51] Int. Cl.[7] .................................................. G06F 17/30
[52] U.S. Cl. ..................... 707/103; 707/101; 707/104; 707/500; 707/531
[58] Field of Search .................................... 707/500, 531, 707/533, 2, 4, 3, 101, 102, 103, 104

[56] References Cited

U.S. PATENT DOCUMENTS

| | | | |
|---|---|---|---|
| 4,773,009 | 9/1988 | Kucera et al. | 707/531 |
| 5,493,728 | 2/1996 | Solton et al. | 711/113 |
| 5,584,024 | 12/1996 | Shwartz | 707/4 |
| 5,815,574 | 9/1998 | Fortinsky | 380/25 |
| 5,860,072 | 1/1999 | Schofield | 707/101 |
| 5,943,674 | 8/1999 | Schofield | 707/104 |
| 5,999,943 | 12/1999 | Nori et al. | 707/104 |
| 6,061,690 | 5/2000 | Nori et al. | 707/103 |

OTHER PUBLICATIONS

Opyrchal et al. "Efficient Object Serialization in Java," IEEE, pp. 96–101, Jan. 1999.

*Primary Examiner*—Thomas G. Black
*Assistant Examiner*—Jean M. Corrielus
*Attorney, Agent, or Firm*—Hickman Palermo Truong & Becker LLP; Brian D. Hickman; Christopher J. Palermo

[57] ABSTRACT

A pickler apparatus and a process for pickling and unpickling data objects are disclosed. Data objects are described in metadata that store attributes of a source data object organized according to an abstract data type, and a data format of the computer system that is hosting the pickler. Using the metadata, the data object is transformed into a linear representation or image. The format, layout, alignment, and inheritance representation of the host system are applied to the image during transformation. The image has a length value, a prefix segment, and a string of bytes copied from the data object. The prefix segment may be the metadata, so that the metadata is transported with the image whereby a receiving process can reconstruct the data object from the image based upon the metadata. The image is canonical and is easily and rapidly transported across a network. When a pointer is encountered in the data object, it is transformed in the string of bytes into a value of the offset in bytes indicated by the pointer, a length of the data that is referenced by the pointer, and a segment of bytes copied from the data that is referenced by the pointer. Nested tables, arrays, and complex collections referenced in the object are efficiently linearized.

59 Claims, 14 Drawing Sheets

APPARATUS AND METHOD FOR PICKLING DATA

FIELD OF THE INVENTION

This invention generally relates to data processing, and relates more specifically to methods of pickling data objects into linearized images that are efficiently transported.

BACKGROUND OF THE INVENTION

Data are not universally transportable from one computer to any other computer. Different computers, operating systems, programming languages, and application software often use different native forms or formats for processing and representing data in memory or other stored form. At least four different data representation problems are known: format representation; layout representation; alignment representation; and inheritance representation.

For example, several different formats can be used to represent numbers in a computer processor, floating-point unit, or memory. Some processors represent a numeric value in memory as a string of bits in which the least significant bit is at the lowest memory location. Other processors represent values with the most significant bit at the lowest memory location. One type of processor cannot properly interpret, or directly access and use, values stored in a memory that were created by the other type of processor. This is known as a format representation problem. Examples of such incompatible processors are the SPARC® and VAX® processors. SPARC processors store multiple-byte quantities with the most-significant byte first, whereas VAX processors store the least significant byte first.

Incompatibilities also exist in code generated from different host programming languages, even when generated for the same processor. For example, programming languages such as C and Pascal enable a programmer to express a set of information in a complex abstract data type such as a record or structure, but there is no universal protocol for representing such abstract data types in a computer memory. Thus, in general, a C language program cannot directly read, write, or use data represented by a Pascal language abstract data type. This incompatibility increases the complexity of computer systems and makes data interchange difficult and inefficient. In addition, such abstract data types may include pointers or addresses that direct a compiler or processor to another memory location a portion of the data of the abstract data type is located. Not all programming languages use or understand pointers. Some programming languages permit a pointer to reference the same abstract data type that contains the pointer. Such "circular references" are not compatible with all languages or platforms and cannot easily be transported over a network.

Further, different processors may represent a data type of a programming language in different ways. For example, the C language defines a floating-point numeric data type called "float". One processor may represent a float in four bytes while another processor may represent a float in eight bytes. Thus, data created in memory by the same program running on different processors is not necessarily interchangeable. This is known as a layout representation incompatibility.

Alignment representation presents yet another problem in data interchange. With some processors, particular values or data types must be aligned at a particular memory location. Certain platforms require that certain size scalar types reside at an address that is a modulus of the scalar size. For example, with SPARC processors, a four byte quantity (such as a float created by a C language program) must reside at a memory address such that the address value has no remainder when divided by four, i.e., a modulo four memory address. When data is interchanged, there is no assurance that the inbound information uses the alignment required by the computer receiving the information.

Still another problem is inheritance representation. Certain object-oriented programming languages, such as C++, support the concept of inheritance, whereby an abstract data type may inherit properties of a previously defined abstract data type. Languages that support inheritance provide extra pointer fields in memory representations of abstract data types or classes that use virtual base classes or virtual functions. Such "inheritance pointers" are instantiated by the host language into a class definition at runtime, and they are neither an explicit attribute of an abstract data type ("ADT") nor are they persistent. There is no standard for the representation of these pointers within a class. The base classes and functions are defined at runtime, and therefore the value of an inheritance pointer is not known until runtime, and is not persistent. Therefore, transmission from one system to another of an instance of an abstract data type that inherits properties from another abstract data type is not generally practical.

Character representation is another problem. Computers used in different nations of the world also may use incompatible character sets. For example, in the United States a string of bits may represent the letter "A" whereas in Japan the same string of bits may represent a Katakana character or pictograph. Thus, the same string of bits may have an entirely different meaning depending on the character set in use. Data formatted in one character set cannot be directly used or interpreted by a system that uses a different character set.

In a networked computer environment, these problems are more acute. A network may be a "heterogeneous environment" that comprises several different types of computers, platforms, or application programs. A programmer writing software for use in a widely distributed network has no assurance that a destination computer can understand information sent from a source machine. Moreover, many network communication protocols are best suited to the transmission of simple, linear strings of values or characters. Complex abstract data types, especially those with pointers, generally cannot be transmitted reliably over such a network in the same form used to represent the data types in memory. Also, when a pointer points to a large or complex collection of data values, such as a table of a database system, it may be impractical or inefficient to convert the entire table to a universal form for transmission over the network.

The general process of transforming data from a source representation to a uniform target representation is known as "pickling" data. An apparatus, process, or computer program product that can carry out pickling is known as a "pickler."

One approach to pickling data is provided in D. Craft, "A Study of Pickling Emphasizing C++" (Olivetti Software Technology Laboratory, paper STL 89-2, 1989). However, the approach proposed by Craft has several disadvantages. For example, in the Craft approach the external representation of an abstract data type is identical to its internal representation, unless an application programmer writes an encode and decode method that specify how to use a different external representation. Thus, an application programmer writing code used in a heterogeneous environment is forced to write encode and decode for every abstract data type defined by the programmer and for every platform. This is impractical in a highly networked environment or in a complex application program.

Further, Craft provides no way to adapt his pickling process to new types of external platforms. Instead, Craft requires the application programmer to account for differences in format, layout, and alignment representation when writing encode and decode. In short, the Craft approach cannot be adapted easily to new or different platforms.

In addition, the Craft approach fails to efficiently pickle abstract data types that include large data collections, such as database tables, or large arrays.

Another approach is to copy data from an object to an image, byte by byte, including all physical pointers. In this approach, the operating system of the host platform is modified so that when the object is reconstituted from the image, the pointers are valid. However, this approach requires complicated memory page mapping or other adjustment of the operating system, which is undesirable because it may adversely affect other application programs.

There is a need for an arrangement that provides rapid and efficient conversion or transformation of a data object from representation in one or more complex abstract data types to a linearized representation that is efficiently interchangeable among networked computer systems.

There is also a need for an arrangement that can convert a linearized representation of a data object into the original memory representation of the data object, including any complex abstract data types that form part of the object.

There is also a need for an arrangement that provides such data transformation and resolve incompatibilities in the format representation, layout representation, alignment representation, and inheritance representation of the original data object and the platform used for transport. There is also a need for an arrangement that provides such data transformation while resolving any circular references in the source data.

There is also a need for an arrangement that provides such data transformation while handling character set transformation.

There is also a need for an arrangement that provides such data transformation while efficiently handling transformation of nested tables and large arrays that form a part of an abstract data type.

There is also a need for an arrangement that provides such data transformation and allows an attribute of a linearized image of a data object to be read or written using the linearized image and without reconstructing the data object.

There is also a need for an arrangement that provides such data transformation in a way that is integrated with and takes advantage of a database system.

There is also a need for an arrangement that provides such data transformation using efficient, powerful and flexible metadata to describe the type, format, location, and other attributes of data that is to be transformed.

There is also a need for an arrangement that provides such data transformation and provides version control, so that the arrangement can convert a data object from one version to another when a linearized image of the data object is reconstituted into the data object.

There is also a need for an arrangement that efficiently provides data transformation for instances of abstract data types that include complex collections of data.

There is also a need for an arrangement that allows the linearized format to be re-configured so that an object can be converted into a format that is native to a new or heterogeneous machine.

There is also a need for an arrangement that can carry out such data transformation on portions of a large data object or portions of a large linearized image of a data object.

There is also a need for an arrangement that can carry out such data transformation in a way that result in an image which is easily stored in a high-performance database system, and efficiently transported and used in a complex network of different machines.

There is also a need for an arrangement that can carry out such data transformation efficiently in a homogeneous networked environment, so that unnecessary data conversions are avoided.

SUMMARY OF THE INVENTION

In light of the foregoing, an apparatus, method, and product for pickling data are provided.

According to one aspect of the present invention, metadata describing attributes of a source data object organized according to an abstract data type, and a data format of the computer system that is hosting the pickler, are stored. Using the metadata, the data object is transformed into a linear representation or image of the data object. The format, layout, alignment, and inheritance representation of the host system are applied to the image as transformation is performed. The image comprises a length value, a prefix segment, and a string of bytes copied from the data object. The prefix segment may be the metadata. A pointer encountered in the data object is transformed in the string of bytes into a value of the offset in bytes indicated by the pointer, a length of the data that is referenced by the pointer, and a segment of bytes copied from the data that is referenced by the pointer. The metadata is transported with the image so that a receiving process can reconstruct the data object from the image by referring to the metadata.

According to another aspect of the present invention, if the format of the source data object and the format of the host system are not the same, then a "stop and copy" procedure is used.

According to another aspect of the present invention, the metadata include a type descriptor segment that stores information about the properties of an abstract data type of the data object, the elements or attributes of the abstract data type, and the character set used by the abstract data type.

According to another aspect of the present invention, the metadata include a format descriptor object for the source platform that stores information about format representation, alignment representation, layout representation, and the character set used by the abstract data type.

According to another aspect of the present invention, the metadata include a location descriptor segment that stores offset values of all attributes or elements of an object organized according to an abstract data type.

According to another aspect of the present invention, an image is re-transformed into a data object represented by an abstract data type of a processor, platform, language, or character set different from that of the original data object that was transformed into the image. The metadata is referenced to perform the re-transformation.

According to another aspect of the present invention, when a pointer to a table is encountered in a source data object, the pointer is transformed in the image into a scalar value representing the offset described by the pointer, and a table identifier that describes the location of the table. According to another aspect of the present invention, when a pointer to a table is encountered in a source data object, the pointer is omitted in the image, and the entire contents of the table is copied linearly into the image.

According to another aspect of the invention, if an attribute of the source data object is a complex abstract data type, a collection image is prepared that describes such complex abstract data type in the same format used for the image. The collection image comprises an abstract data type image for each abstract data type defined by the complex abstract data type.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Figure 1:
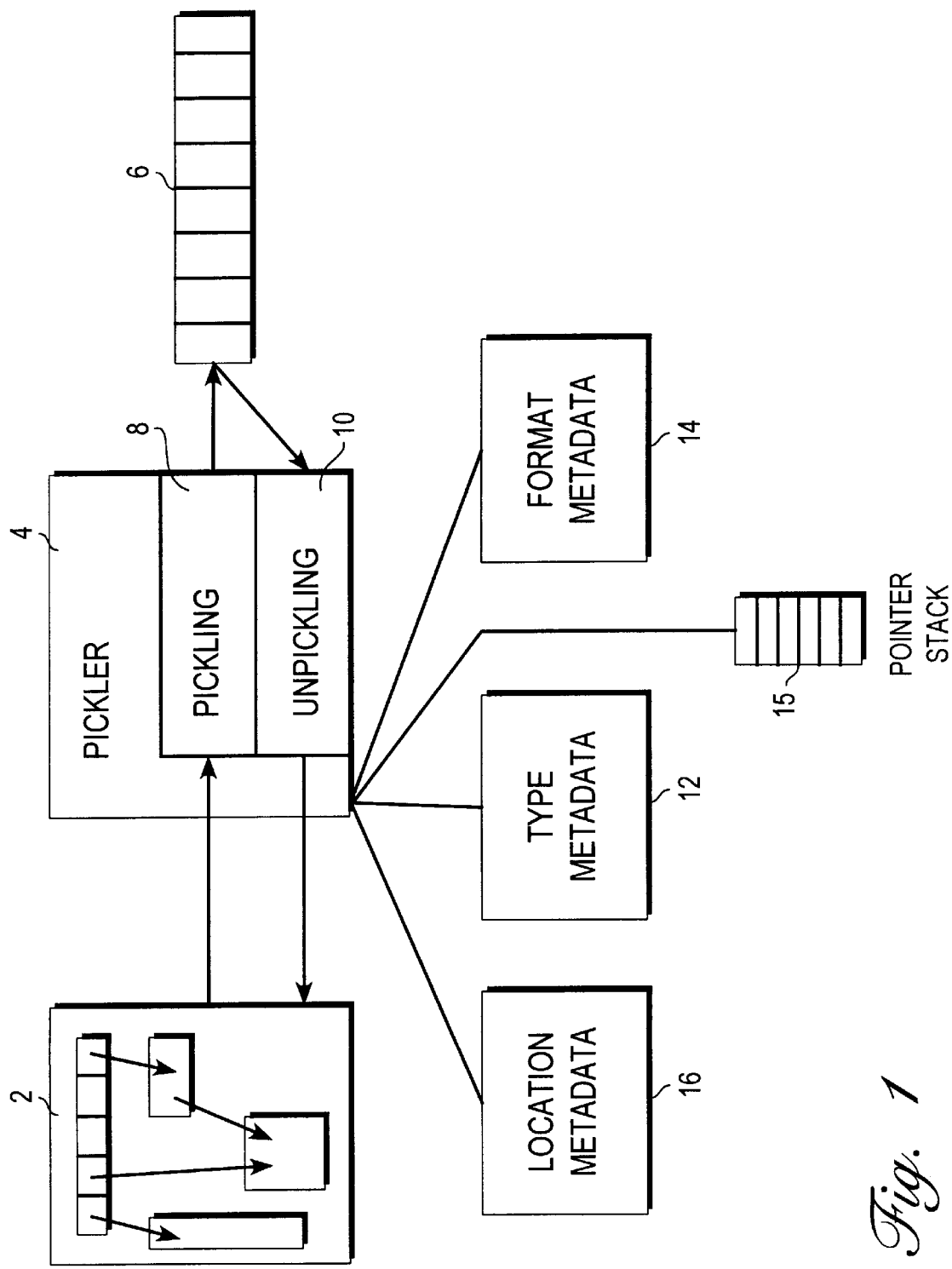
FIG. 1 is a diagram of an embodiment of the invention.

A method and apparatus for pickling data is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

Abstract Data Types

Computer programming languages commonly represent information structures using abstract data types ("ADTs"). ADTs provide a way to classify information. In data processing, every constant, variable, expression, function, or combination has a certain type. Thus, an abstract data type is an abstract representation of data. An abstract data type is made into an explicit representation of the type using a declaration of the constant, variable, or function. The thing that is declared is called a data object or simply an object. For example, in the C language a programmer can define an abstract data type as:

typedef enum weekday {Monday, Tuesday, Wednesday, Thursday, Friday };

This example assumes that earlier in the same program, the days of the week have been defined. The programmer can then define an explicit object "Day" of the type "weekday" as follows: weekday Day;

Thereafter, the programmer can use the variable in expressions that refer to values of the abstract data type, such as: Day=Thursday;

A detailed discussion of ADTs and data structures is provided in N. Wirth, "Algorithms+Data Structures= Programs" (Englewood Cliffs, N.J.: Prentice-Hall, 1976).

ADTs may be considerably more complex than the type <weekday> shown above. In this document, embodiments of the invention will be illustrated in part with reference to examples that use the complex ADT called <employee> that is shown in Table 1.

TABLE 1

ADT <EMPLOYEE>

```
struct Employee {
    char[20] Name;
    Date Hired;
    *Employee [1..Max_Supes] Supervises;
    *Dept_Name Department;
    int Salary;
    char[16] Position
}
```

The ADT of Table 1 describes a hypothetical employee of a company and is therefore named Employee. Objects of type Employee have a Name attribute that stores the employee's name as a string of up to 20 characters. The Hired attribute is defined as type Date; the example presumes that the programmer has previously defined type Date to store calendar dates. The Supervises attribute defines other employees who are supervised by this employee. The Supervises attribute is an example of what is referred to in this context as a circular reference; it is an array of pointers to objects of type Employee. The Department attribute is a pointer to a department name of the type called Dept_ Names. The Salary attribute is an integer that stores the employee's annual salary. The Position attribute is a character string that stores a description of the employee's job.

Canonical and Native Representations

Pickling can be carried out by transforming an object into an "image" in a format that is platform-neutral. Image, in this context, refers to a representation of a data object, or an instance of an ADT, that is stored as a string of unsigned bytes and that contains no pointers to physical memory addresses, but which may contain logical pointers to locations within the image. In this approach, the image is said to have a "canonical" format, and whenever the pickler is invoked, it inherently knows the format of the image. For example, a canonical format may define all integers as stored with the most significant byte at the highest memory location ("big-endian") format, all float type data is stored in IEEE format, etc. The advantage of this approach is that the image does not need to be accompanied with extra data that describes the image format. However, the significant disadvantage of this approach is that many unnecessary conversions to and from canonical representation must be performed in a computing environment in which all machines are the same.

An alternative method is to pickle an object into an image that has a format native to the host system on which the pickler is running, and to associate with the image certain metadata that describes the image format. For example, a pickler running on a SPARC processor pickles an object into an image in which all types are represented in the same format used internally by the SPARC processor. When the image is sent to a VAX computer, the image is accompanied by metadata that describes the format of the image. A copy of the same pickler, running on the VAX, interprets the metadata and performs any necessary conversions on the image. This is called pickling using "native format." Its advantage is speed, because it avoids unnecessary conversions in a homogeneous computing environment. Native format pickling is also advantageous when integrated with a database system or server, as the metadata can be represented in database tables. In preferred embodiments of this invention, native format is used.

Although native format is used, the metadata and the image are defined in a simple or linear format. Each metadata object used by the pickler and described below preferably is stored as an array of octets or unsigned single-byte quantities. In the Oracle8 Server database system, such octets are known as type ub1. Representing metadata in a canonical format has the advantage that the metadata itself may be pickled and unpickled without carrying out format, alignment, layout, or representation conversions. In addition, second metadata is not required to describe the format, alignment, or representation of the first metadata. Accordingly, transporting metadata within a pickled image is rapid and efficient.

Overview of pickling System

FIG. 1 is a block diagram of an embodiment of a pickling system. An object 2, which is an instance of an abstract data type, is stored in the memory of a computer system, and is fed to a pickler 4. The pickler 4 comprises a pickling mechanism 8 and an unpickling mechanism 10. As output, the pickling mechanism 8 produces a linearized representation or image 6 of the object 2. The unpickling mechanism 10 carries out the complementary function; it transforms the image 6 into the object 2 in the memory. In this context, the term "mechanism" means a data processor operating under control of a stored program, a computing process, a computer program, subroutine, or procedure, a combination of electronics or other hardware arranged to perform the disclosed functions, firmware, or a combination of the foregoing.

Unlike other picklers that produce native format images, both the pickling mechanism 8 and the unpickling mechanism 10 operate with reference to stored metadata that describes the abstract data type of the object 2. In the preferred embodiment, the pickler 4 communicates with type metadata 12, format metadata 14, and location metadata 16. The type metadata 12 describes the abstract data type of the object 2 to enable the pickler 4 to convert the object 2 from its representation in the memory into a linear string of bytes that form the image 6. The format metadata 14 describes the data format used by the computer system or platform for which the object 2 was created, and the data format of the image. In the preferred embodiment, the format metadata 14 describes the alignment and layout representations used by the platform on which the object 2 is stored before pickling and representations to be used by the image. In contrast to prior picklers, the pickler 4 advantageously uses the format metadata 14 and the type metadata 12 to carry out comprehensive transformations of the format, representation, and alignment of information in the object 2 to comport with desired format, representation, and alignment characteristics of the image 6.

The location metadata 16 describes where a particular attribute of the abstract data type is located within the object 2. The location metadata 16 is used for optimization of pickling; it enables the pickler 4 to locate a particular attribute in the object 2 rapidly by looking up its location.

The pickler 4 also uses a pointer stack 15 that is stored in a memory associated with the pickler 4. The pointer stack 15 is used to store pointers encountered in an ADT when pickling or in an image when unpickling so that duplicate pointers are not created and so that endless loops do not occur when pointers are pickled.

In the preferred embodiment, the ADT of the object 2 is one of the types defined in the Open Type System (OTS) as implemented in the Oracle 8 Server database system commercially available from Oracle Corporation, Redwood Shores, California. A description of the Open Type System is provided in the Appendix. The pickler 4 forms a part of a database system, such as the Oracle8 Server. Thus, the pickling mechanism 8 and the unpickling mechanism 10 preferably are embodied as computer program functions that can be called by a database server, or by an application program running under control of the database server. However, the invention is not limited to such an embodiment. In one embodiment, the pickling and unpickling mechanisms are organized as a stand-alone computing process called a pickling engine. The pickling engine is passed an object to be pickled, metadata describing the object, and a location of the image. The pickling engine pickles the object into the image, following all physical pointers and references to other ADTs within the object. The pickling engine operates in an environment independent manner. In an alternative embodiment, the computer program functions are callable individually from an application program in a process called marshalling. In marshalling, the application program calls a pickling or unpickling mechanism repeatedly for each attribute of an ADT that is to be pickled. However, this invention is not limited to database systems, and can be implemented in any other application having one or more of the needs described above.

Type Descriptor Segment

A set of values that indicates type metadata about a data object is generally referred to herein as a Type Descriptor Segment. According to one embodiment of the invention, a Type Descriptor Segment may store values such as those illustrated in FIG. 2A. However, the exact content of a Type Descriptor Segment may vary from implementation to implementation and is not limited to the structure shown in FIG. 2A. The present invention is not limited to the use of type descriptor segments that contain any particular set of values.

Figure 2A:
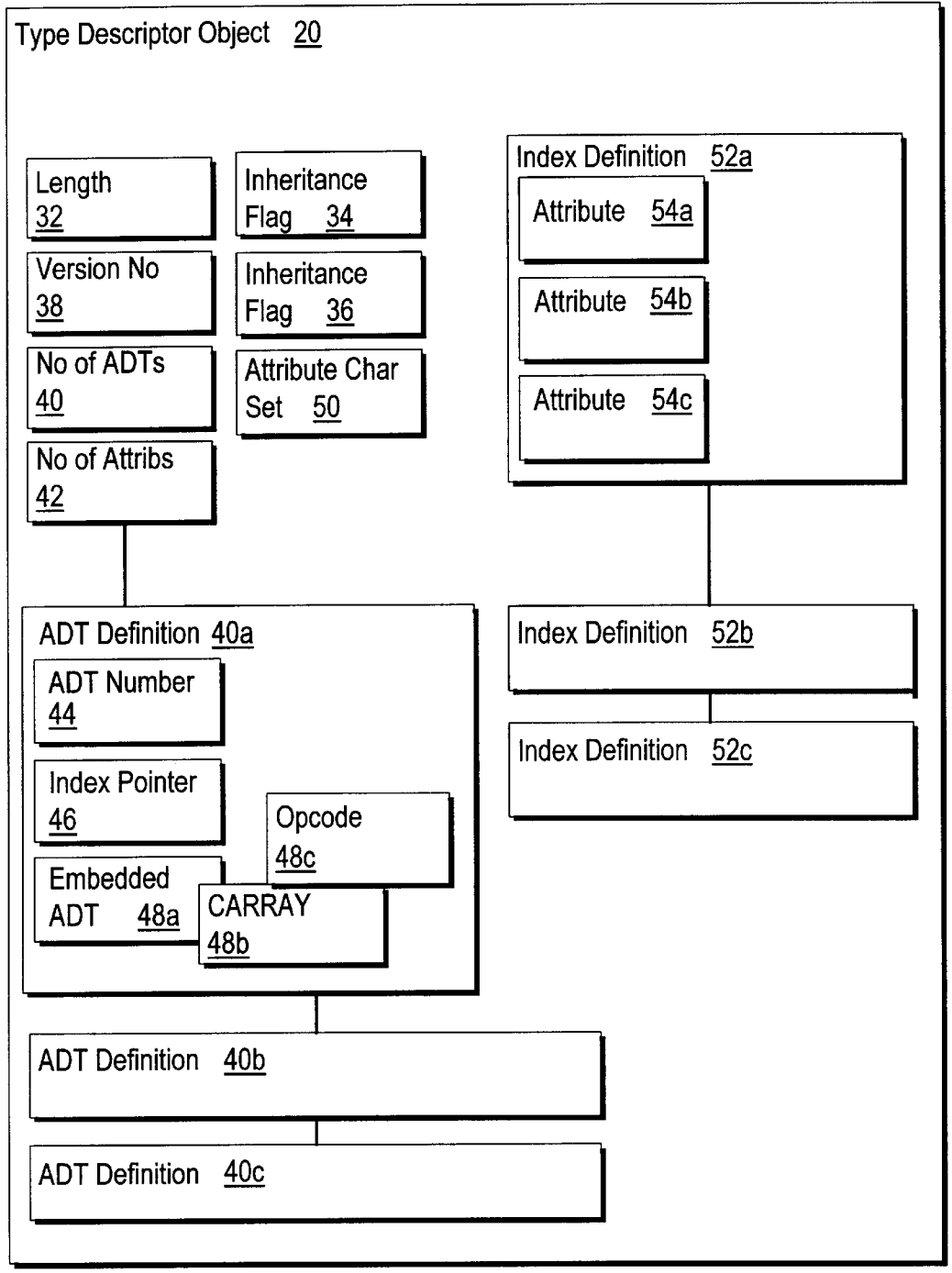
FIG. 2A is a diagram of the data structure of a type descriptor object and a type descriptor segment.

In the preferred embodiment, as shown in FIG. 2A, a set of Type Descriptor Segments (TDS) 30 are stored in a Type Descriptor Object 20. One or more Type Descriptor Segments 30 are created by an application program before pickling mechanisms are used. For example, the pickling mechanism 8 provides a public application programming interface (API) that has a function for generating a Type Descriptor Segment 30 from an ADT. The application program calls the function of the API before calling the pickling process. Preferably, the Type Descriptor Object 20 is a table of a database system, and each Type Descriptor Segment 30 is a record or row of the table. However, storage in a database system is not required, and the Type Descriptor Segment can be stored in any other suitable data storage form. The Type Descriptor Segment 30 comprises the fields shown in FIG. 2A, and has an OTS type of array<octet>. Each field may be represented as a column in the Type Descriptor Object 20 database table.

The Type Descriptor Segment 30 is a variable length object. Accordingly, a Length field 32 holds a numeric value that identifies the length in bytes of the remainder of the Type Descriptor Segment 30. A Version No field 38 stores a value uniquely identifying the format of the Type Descriptor Segment 30. Version No field 38 enables the format of a TDS 30 to be changed without adversely affecting operation of a program that uses the TDS 30. By reading the Version No field 38, the pickling mechanism can determine whether the TDS 30 has changed since the last access.

The Type Descriptor Segment 30 also has a Number Of ADTs field 40 that stores the number of abstract data types represented in the remainder of the Type Descriptor Segment 30. A Number Of Attributes field 42 stores the total number of attributes of all the ADTs stored in the Type Descriptor Segment 30. The Number Of ADTs field 40 and the Number Of Attributes field 42 are used to calculate the locations in the Type Descriptor Segment 30 of different ADTs and their attributes.

The Type Descriptor Segment 30 may also store zero or more ADT definitions 40a, 40b, 40c. In the example Type Descriptor Segment 30 shown in FIG. 2A, three ADT definitions 40a, 40b, and 40c are shown. As indicated by the label "ADT Def n" of the third ADT definition 40c, any number of ADT definitions may be included in a Type Descriptor Segment 30 according to the needs of a client or application program that uses the pickler.

Each ADT definition has the structure shown in FIG. 2A for ADT definition 40a. The ADT definition 40a stores an ADT Number 44 that contains a unique identifier for the ADT that is represented by the ADT definition 40a. Preferably the ADT Number 44 is a two-byte value that corresponds to a name of the ADT that is defined in a declaration of the ADT in the source code of an application program. The ADT definition 40a also stores a four-byte index pointer 46. The index pointer 46 indicates the number of bytes from the beginning of the ADT definition 40a to an index definition that is associated with the ADT definition 40a. The index definition is one of the index definitions 52a, 52b, or 52c shown in FIG. 2A, which are discussed further below.

The ADT definition 40a also stores information that describes the ADT associated with the ADT definition 40a. This information may be stored in one of three forms. The ADT may be embedded in the ADT definition 40a by storing a string of bytes representing the ADT in the Embedded ADT field 48a. For example, if the ADT is a simple scalar type, such as an unsigned two-byte type, it may be more efficient to store the ADT directly in the ADT definition 40a rather than storing descriptive information about the scalar type. Alternatively, when the ADT has a table, a varying-length array (such as the varray type that is supported by the Oracle8 Server database management system) or other large collection of data, the ADT definition 40a stores a four-byte location identifier 48b that points to the location of the collection. When the ADT is a simple data type, the ADT definition 40a stores an opcode 48c that identifies the simple data type. Examples of simple data types are DECIMAL,; NUMBER; FLOAT; SQL_CHAR; RAW; SQL_VARCHAR2; DATE; DOUBLE; INTEGER; SINT32; REF; LOB; VARRAY; UINT8; SINT8; UINT16; and UINT32. These data types are defined in the Open Type System as implemented by Oracle8 Server, and are described in published application programmer's documentation for the Oracle8 Server, commercially available from Oracle Corporation of Redwood Shores, Calif. However, other data types may be defined as simple types and still fall within the scope and spirit of the present invention. In the preferred embodiment, an opcode is an integer that uniquely identifies the simple type. For example, the opcode "2" can identify NUMBER type, "96" defines CHAR, etc. Preferably, the opcodes identify each and every type in the Open Type System (OTS).

One type of ADT attribute is a User Picklable Type (UPT). A UPT is a collection of information that allows an application to store in an image information that is not suited to an OTS type. An application program can specify whether a UPT should be pickled inline (in the image) or out-of-line (not in the image). In contrast, ADT attributes other than UPTs are always pickled inline. Examples of UPTs include nested tables or varrays. When an attribute of the ADT is a UPT, one of four special opcodes is used. The four opcodes indicate whether the attribute is a table to be pickled inline; a table to be pickled out-of-line ; a varray to be pickled inline; or a varray to be pickled out-of-line. These special opcodes are used in pickling and out-of-line pickling of collections, in a process that is described further below. The opcode to be used for a UPT is selected or declared by the application program at the time an ADT is declared.

Two types of varying length arrays are recognized by the pickler. A varray type is defined in OTS, and an attribute of that type is pickled out-of-line as a UPT in the manner described below. A carray type is also recognized. A carray is a length-prefixed variable length array. In a carray, a hidden length field is stored in association with data. Carray objects are pickled inline.

When an attribute of the ADT is complex, such as a UPT or a nested ADT that contains a UPT, the pickler stores a Collection opcode in the metadata associated with the ADT. Preferably, the Collection opcode is stored in the Type Data Segment associated with the ADT. The Collection opcode indicates that the pickler should use collection images in writing the image. Pickling using collection images is described below.

The Embedded ADT field 48a, identifier 48b, and opcode 48c may appear in any order and more than once in an ADT definition such as ADT definition 40a. For example, an ADT definition of the Employee ADT would store seven instances of the Embedded ADT field 48a or opcode 48c. An identifier 48b would not be used because the Employee ADT does not contain a varray or other user-defined type for a large data collection.

Other combinations of opcodes 48c, tags and companion opcodes can be used to describe all other attributes of an ADT. In this way, a Type Descriptor Segment 30 conceptually "flattens out" or "flattens" a complex ADT into a linear string of opcodes that define the ADT.

For each of the ADT definitions 40a, 40b, 40c, the Type Descriptor Segment 30 stores an index definition 52a, 52b, 52c. In the example of FIG. 2A, three ADT definitions and three index definitions are shown, but there may be more or less, provided that there is a one-to-one correspondence between ADT definitions and index definitions. If the Type Descriptor Segment 30 has zero ADT definitions, then the Type Descriptor Segment stores zero index definitions.

Each index definition has the structure shown for index definition 52a, and stores one or more attribute offsets 54a, 54b, 54c. As indicated by the label "Attribute n" shown in FIG. 2A for attribute offset 54c, an index definition may store any number of attribute offsets. Each of the attribute offsets 54a, 54b, 54c stores a value indicating the offset in bytes from the beginning of the Type Descriptor Segment 30 to one attribute of the ADT stored in the ADT definition. For example, the first attribute offset 54a indicates the offset from the beginning of Type Descriptor Segment 30 to the opcode 48c for the first attribute of the ADT stored in ADT definition 40a. The second attribute offset 54b indicates the offset for the second attribute of the ADT defined by ADT definition 40a. Using the attribute offsets in the index definitions, the processes described herein can rapidly locate a particular attribute of an abstract data type.

First and second Inheritance Flags 34, 36 indicate whether the ADT that is described by the Type Descriptor Segment 30 has certain inheritance characteristics. Preferably, the first and second Inheritance Flags 34, 36 store Boolean values that respectively indicate whether the ADT can inherit other ADTs, and whether the ADT described by the Type Descriptor Segment 30 might contain inheritance pointers.

The Type Descriptor Segment also stores Attribute Character Set information 50. Using the Character Set information 50, the Type Descriptor Segment provides support for multiple character sets. In one embodiment, all character type attributes of an ADT use the same character set. In this embodiment, the character set of the host platform is stored in the Format Descriptor Object as discussed below. In an alternative embodiment, each character type attribute of an ADT may have a different character set. For example, an application program may define an ADT with a character type attribute that uses a character set other than the default character set of the platform. In such a case, the Attribute Character Set information 50 stores character data for the attributes that do not use the default character set. Thus, a character set identifier is stored in the Type Descriptor Segment in association with the information that describes an attribute. The Character Set information 50 overrides any default character set identifier stored in the Format Descriptor Object. The Character Set information 50 is stored as in a canonical format, such as a pair of unsigned bytes.

Format Descriptor Object

A set of values that indicates format metadata about a data object is generally referred to as a Format Descriptor Object. According to one embodiment of the invention, a Format Descriptor Object may store values such as those illustrated in FIG. 2B. However, the exact content of a Format Descriptor Object may vary from implementation to implementation, and is not limited to the structure shown in FIG. 2B. The present invention is not limited to the use of format descriptor objects that contain any particular set of values.

Figure 2B:
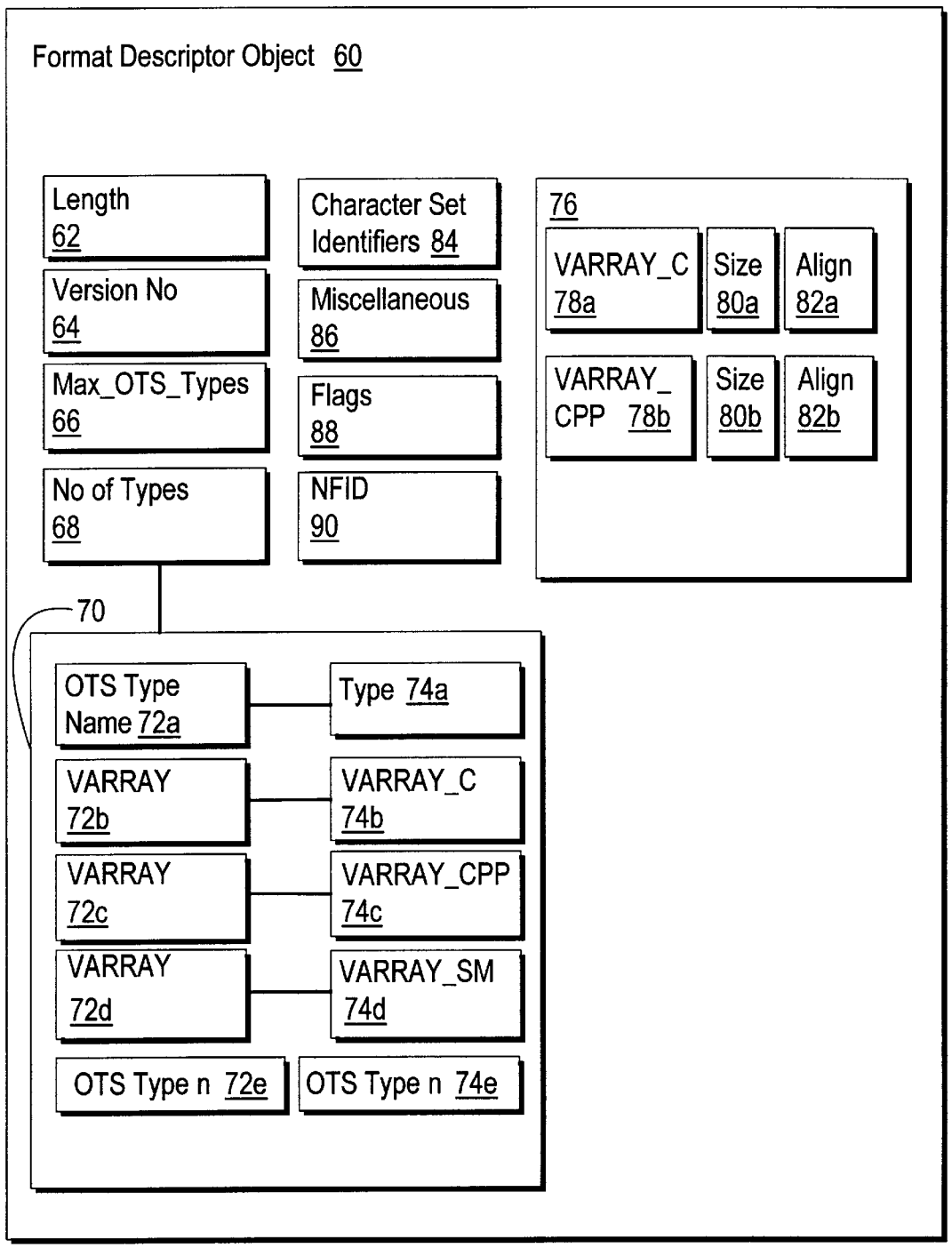
FIG. 2B is a diagram of a format descriptor object.

FIG. 2B is a block diagram of a preferred Format Descriptor Object (FDO) 60. The Format Descriptor Object 60 stores information about format representation, alignment representation, layout representation, and character sets used by the host platform. The term "platform" refers to the combination of a processor and a host language compiler, for example, C on SPARC or C++ on VAX/VMS. The Format Descriptor Object 60 also stores information about whether the host language supports inheritance pointers, and whether the host language has inheritance order. Inheritance order is the order in which inherited ADTs are laid out in memory for a derived ADT. Certain compilers enforce an inheritance order whereby the compiler determines the order of inherited ADTs. Generally, C++ has inheritance order and C does not. In the preferred embodiment, the Format Descriptor Object 60 is an array of unsigned one-byte quantities, which is essentially a canonical, machine-independent format.

An application program that uses pickling or unpickling links a Format Descriptor Object 60 matching the desired host platform into the application program. Preferably, a platform library is stored in a storage device of a computer that runs the pickling and unpickling mechanisms described herein. There is one library for each platform on which the application program runs. Each platform library contains a copy of a Format Descriptor Object 60 appropriate for that platform. The application program is linked to the appropriate library in order to load the correct Format Descriptor Object 60 when the application program is compiled.

The Format Descriptor Object 60 also has a Length attribute 62. In the preferred embodiment, the Length attribute 62 stores the number of bytes that make up the Format Descriptor Object 60, less the bytes that are used to store the Length attribute. Alternatively, the Length attribute 62 may store the overall length in bytes of Format Descriptor Object 60. The Format Descriptor Object 60 also has a Format Descriptor Object_Version attribute 64 that stores a unique version number for identifying the Format Descriptor Object. The Format Descriptor Object_Version attribute 64 is used by pickling and unpickling mechanisms to ensure that the same version of the Format Descriptor Object is used when it is needed multiple times, and for compatibility checks.

A Max_OTS_Types attribute 66 of the Format Descriptor Object 60 stores the total number of data types that exist in the Open Type System. This represents the maximum number of types that can be described in the Format Descriptor Object 60. A Num_Types attribute 68 stores the number of OTS types that are actually described in the Format Descriptor Object 60.

The Format Descriptor Object 60 has a Layout Representation section 70 that stores information that provides a mapping of each OTS type to a platform-specific implementation of that OTS type. The Layout Representation section 70 has a set of pairs of values, in a number indicated by the Num_Types attribute 68. For example, if the Max_OTS_Types attribute 66 has a value of 20, and the Num_Types attribute 68 has a value of 16, then the Format Descriptor Object 60 stores 16 pairs of values in the Layout Representation section 70. Each pair of values is an OTS type name 72a and a platform-specific type name 74a. In the example of FIG. 2B, five exemplary pairs of values are shown, namely pairs 72a, 74a; 72b, 74b; 72c, 74c; 72d, 74d; and 72e, 74e. Any number of pairs may be provided, as indicated by the labels "OTS Type n" and "Type n" shown for the fifth pair 72e, 74e. In general, the value n is equal to the value of the Num_Types attribute 68.

The pairs provide a mapping between an OTS type and an equivalent abstract data type implemented on the particular platform defined by the Format Descriptor Object 60. The mapping is needed because ADT attributes may need to be pickled into a layout format different from the default format. For example, in the C language, an OTS attribute of type REAL is internally represented as type float. However, the application program may need to store the attribute in another format. Also, more complex types such as CARRAY may be unsupported in a particular language and must be pickled into a supported layout. Thus, as shown in the example of FIG. 2B, for a single type CARRAY there may be multiple platform-specific type names CARRAY_C, CARRAY_CPP, CARRAY_SM. These pairs indicate that a different format is used for the CARRAY data type when implemented in the C, C++, and SmallTalk languages for the platform defined by the Format Descriptor Object.

For each of the platform-specific type names, the Format Descriptor Object 60 has an alignment segment 76 that contains pairs of size and alignment values stored in association with a platform-specific type name. The platform-specific type name CARRAY_C 78a is associated with a size value 80a and an alignment value 82a. The size value 80a indicates the size, in bytes, of the CARRAY_C type. The alignment value 82a reflects the alignment used for the CARRAY_C type. Thus, using the Layout Representation section 70 and the alignment segment 76, the mechanisms described herein can obtain the size and alignment for any OTS abstract data type for any supported platform.

In an alternate embodiment, the Type Descriptor Segment is provided with Alternate Mapping information indicating that a first declaration of a type maps to a first type, and that a second declaration of the same type maps to a second type. The Format Descriptor Object cooperates with the Alternate Mapping information to establish multiple mappings of a type in the Layout Representation section of the Format Descriptor Object.

The Format Descriptor Object also stores a two-byte Character Set Identifier 84 that designates the character set of all strings within an object or image of the platform defined by the Format Descriptor Object. The Character Set Identifier 84 identifies the default character set of the platform. During character string translations performed by the pickling mechanisms, the Character Set Identifier 84 is overridden by any Character Set information 50 in the Type Descriptor Segment of the object being pickled.

Miscellaneous data 86 stored in the Format Descriptor Object 60 indicates whether the platform defined by the Format Descriptor Object uses big-endian or little-endian storage format, ones complement or twos complement, the representation format used for floating point values, and other information. Inheritance flags 88 indicate whether the host language or platform supports inheritance order or inheritance pointers. In the preferred embodiment, miscellaneous data 86 inheritance flags 88, and other representation information in the Format Descriptor Object 60 is extracted from a Network Format Identifier (NFID) 90. A set of Network Format Identifiers 90 that identify various network formats are stored in a location that is accessible to the Format Descriptor Object 60. Each Network Format Identifier 90 provides representation and alignment information for a platform. In the preferred embodiment, the Network Format Identifier 90 stores the information shown in Table 2.

TABLE 2

NETWORK FORMAT IDENTIFIER ATTRIBUTES

| Storage Format | Attribute Name | Attribute Contents |
| --- | --- | --- |
| unsigned 4 bytes | flags_ncrfid | flags that indicate whether the platform uses ASCII or EBCDIC character format and ones or two's complement numeric format |
| unsigned word | bits_per_byte_ncrfid | number of bits in a byte |
| unsigned word | b2_size_ncrfid | number of bytes in a b2 data type |
| unsigned word | b4_size_ncrfid | number of bytes in a b4 data type |
| unsigned word | b8_size_ncrfid | number of bytes in a b8 data type |

TABLE 2-continued

NETWORK FORMAT IDENTIFIER ATTRIBUTES

| Storage Format | Attribute Name | Attribute Contents |
| --- | --- | --- |
| unsigned word | word_size_ncrfid | number of bytes in a word data type |
| unsigned word | ptr_size_ncrfid | number of bytes in a pointer data type |
| unsigned word | float_size_ncrfid | number of bytes in a float data type |
| unsigned word | double_size_ncrfid | number of bytes in a double data type |
| unsigned word | bigora_size_ncrfid | number of bytes in a bigora data type |
| unsigned word | b1_align_ncrfid | alignment in bytes for a b1 data type |
| unsigned word | b2_align_ncrfid | alignment in bytes for a b2 data type |
| unsigned word | b4_align_ncrfid | alignment in bytes for a b4 data type |
| unsigned word | b8_align_ncrfid | alignment in bytes for a b8 data type |
| unsigned word | word_align_ncrfid | alignment in bytes for a word data type |
| unsigned word | ptr_align_ncrfid | alignment in bytes for a pointer data type |
| unsigned word | struct_align_ncrfid | alignment in bytes for a struct data type |
| unsigned word | float_align_ncrfid | alignment in bytes for a float data type |
| unsigned word | double_align_ncrfid | alignment in bytes for a double data type |
| unsigned word | bigora_align_ncrfid | alignment in bytes for a bigora data type |
| unsigned word | b2_order_ncrfid[2] | buffer positions of the b2 bytes |
| unsigned word | b4_order_ncrfid[4] | buffer positions of the b4 bytes |
| unsigned word | b8_order_ncrfid[8] | buffer positions of the b8 bytes |
| unsigned one byte | *word_order_ncrfid | pointer to buffer positions of the word bytes |
| unsigned one byte | *bigora_order_ncrfid | pointer to buffer positions of the bigora bytes |
| unsigned one byte | *float_order_ncrfid | pointer to buffer positions of the float bytes |
| unsigned one byte | *double_order_ncrfid | pointer to buffer positions of the double bytes |

The Format Descriptor Object 60 is created at runtime upon initialization of an application program that is using the pickler. The pickler has a function that generates a Format Descriptor Object 60 for the platform on which the pickler is being run. The function will form the Format Descriptor Object 60 by calling a routine that creates a Network Format Identifier 90 for the platform, and then storing information from the Network Format Identifier 90 into the Format Descriptor Object 60. Preferably, the function that builds the Format Descriptor Object 60 includes macros, procedures, routines or other program constructs that provide support functions. The support functions include locating needed information in the Network Format Identifier 90, retrieving bit quantities and flags from within byte strings of the Network Format Identifier 90, extracting size and alignment information from the Network Format Identifier 90, and setting equivalent quantities in the Format Descriptor Object 60. The support functions takes into account any format differences between the platform defined by the Network Format Identifier 90 and the platform on which the function is running.

Location Descriptor Segment

A set of values that indicates location metadata about a data object is generally referred to as a Location Descriptor Segment. According to one embodiment of the invention, a Location Descriptor Segment may store values such as those illustrated in FIG. 2C. However, the exact content of a Location Descriptor Segment may vary from implementation to implementation. The present invention is not limited to the use of location descriptor segments that contain any particular set of values.

Figure 2C:
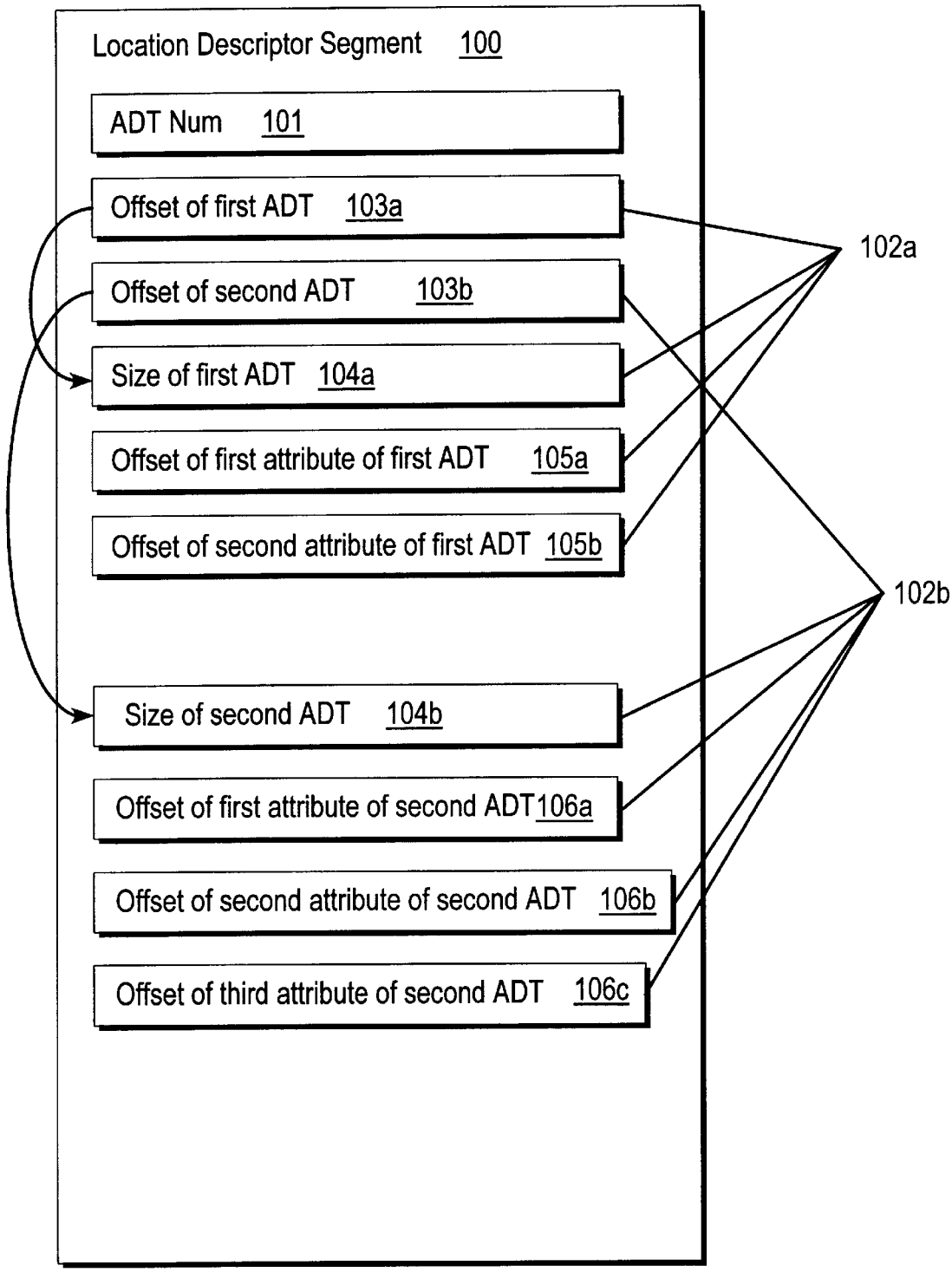
FIG. 2C is a diagram of a location descriptor segment.

In the preferred embodiment, the Location Descriptor Segment (LDS) 100 has the structure shown in FIG. 2C. Generally, the LDS 100 provides a vector of offsets of all attributes of all ADTs defined in the Type Descriptor Segment 30. The LDS 100 stores an ADT Number 101 that matches and is keyed to the ADT Number 44 of an ADT in a Type Descriptor Segment 30. The LDS 100 can be stored as a row of a table in a database system. The ADT Number 101 and other fields of the LDS 100 are columns of the table, and the ADT Number is a key.

The LDS 100 is organized as a set of offset values 103a, 103b that point to respective chains 102a, 102b each comprising a size value and a set of attribute offset values. The exemplary LDS 100 of FIG. 2C represents an ADT having two ADTs; the first ADT has two attributes and the second ADT has three attributes. For example, chain 102a has a size value 104a and offset values 105a, 105b. The size value 104a indicates the size in bytes of the ADT represented by the chain 102a. The offset values 105a, 105b indicate the offset in bytes of three attributes of the ADT represented by the chain 102a. Each chain has an offset value for each of the attributes of the ADT represented by the chain. The ADT offset values 103a, 103b point to the size values 104a, 104b.

The pickler system stores one LDS 100 for each combination of TDS 30 and a Format Descriptor Object 60. However, an LDS 100 may contain information for more than one ADT, for example, when one ADT points to another. If a first ADT has four attributes, and one is a pointer to a second ADT that has three attributes, then the LDS 100 for the first ADT has seven chains.

In the preferred embodiment, the LDS 100 is stored as an array of unsigned four-byte quantities. The principal function of the LDS 100 is to optimize dynamic attribute access operations by providing a vector of attribute offsets. It provides a rapid way to look up the location of attributes.

Preferably, the pickler includes a function that will return the size of an ADT or the offset of an attribute of an ADT. The attribute size function accepts as arguments values identifying an LDS, an ADT, and an attribute. To obtain the size of the fourth ADT known to the system, an application program can include a function call AttributeSize(LDS, 4)[0] where the [0] parameter indicates that the size should be returned. To obtain the offset of the third attribute of the fourth ADT, the application program can issue the call AttributeSize(LDS, 4)[3].

The pickler also has a generate_LDS function that takes a Type Descriptor Segment and a Format Descriptor Object as arguments. The function creates an LDS for the ADT defined in the Type Descriptor Segment, using the Format Descriptor Object to compute offsets and sizes for the host platform. Preferably, the pickling mechanism creates the LDS when the object's host language has no inheritance pointer or inheritance order. Alternatively, when the host language of the object has inheritance ordering but no inheritance pointers, the LDS is obtained as a parameter to the pickler.

Image Format

Figure 2D:
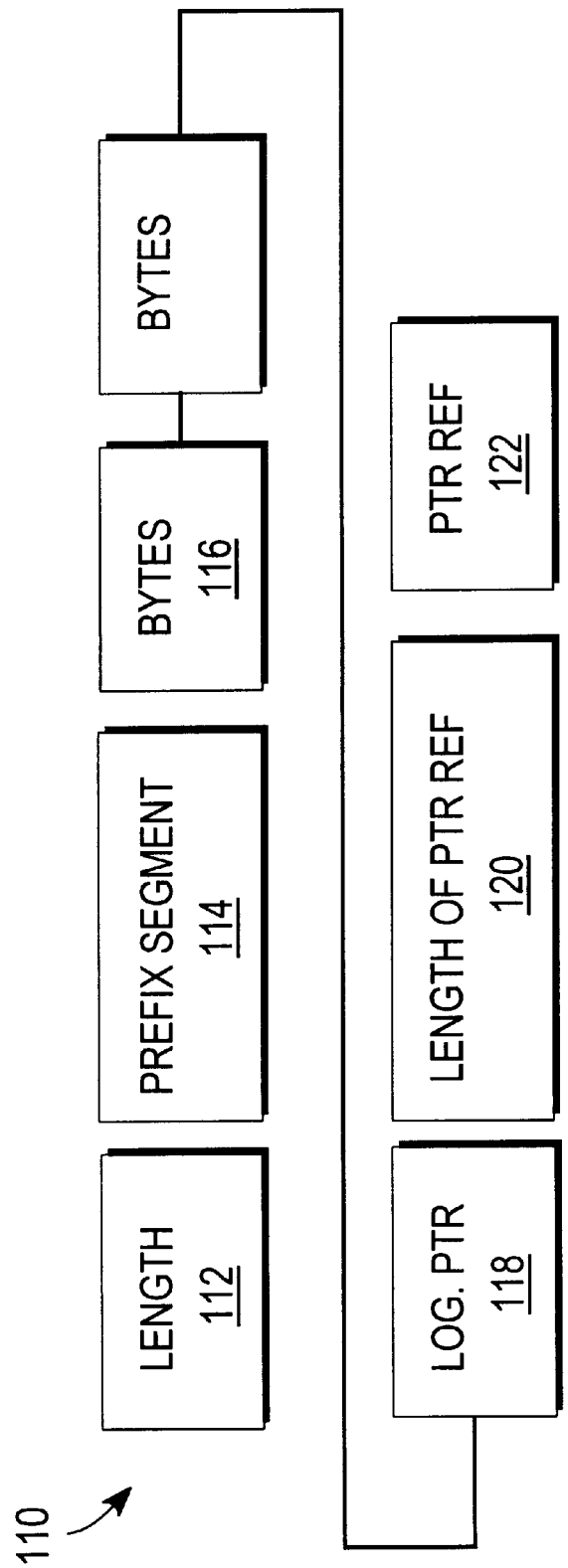
FIG. 2D is a diagram of a first image.

FIG. 2D is a block diagram of the structure of an image that is produced when an object is pickled in an embodiment of the invention. In the preferred embodiment, an image 110 has a length value 112 that indicates the total length in bytes of the image. The length value 112 is stored in the image 110 because the image has a varying length.

The image 110 may also store a prefix segment 114, which is a user-defined string of bytes. The prefix segment 114 is not interpreted in the pickling or unpickling mechanisms. The prefix segment 114 bytes enables an application program to transport its own metadata or other information with an ADT that is linearized into the image 110. For example, an application program can use the pickling mechanisms described below to pickle each Type Descriptor Segment and Format Descriptor Object used by the application program. The pickled information can be written into the prefix segment 114 of an image of other information. In this way, all the metadata needed to re-create objects from an image can be carried with the image to a remote machine or unpickling mechanism. At the remote machine or process, the LDS is re-created based upon the FDO and TDS. The term "prefix" is used for convenience and is not intended to be limiting; the prefix segment 114 can be located anywhere in the image.

The image 110 stores a string of bytes 116 that is a linearized representation of an object 2. Methods of generating the string of bytes 116 are discussed in more detail below.

If the ADT of object 2 contains a physical pointer, then using the methods described below, the physical pointer is converted into a logical pointer 118 and stored in the image 110. The logical pointer 118 is followed by a length value 120 that contains the length in bytes of the object that the physical pointer references, and the data referenced by the pointer 122 in linearized form.

The image 110 shown in FIG. 2D is merely exemplary. Depending on the structure of the ADT of an object that is pickled, the image 110 may have more than one string of bytes 116 and more than one set of a logical pointer 118, length value 120, and referenced data 122.

Figure 2E:
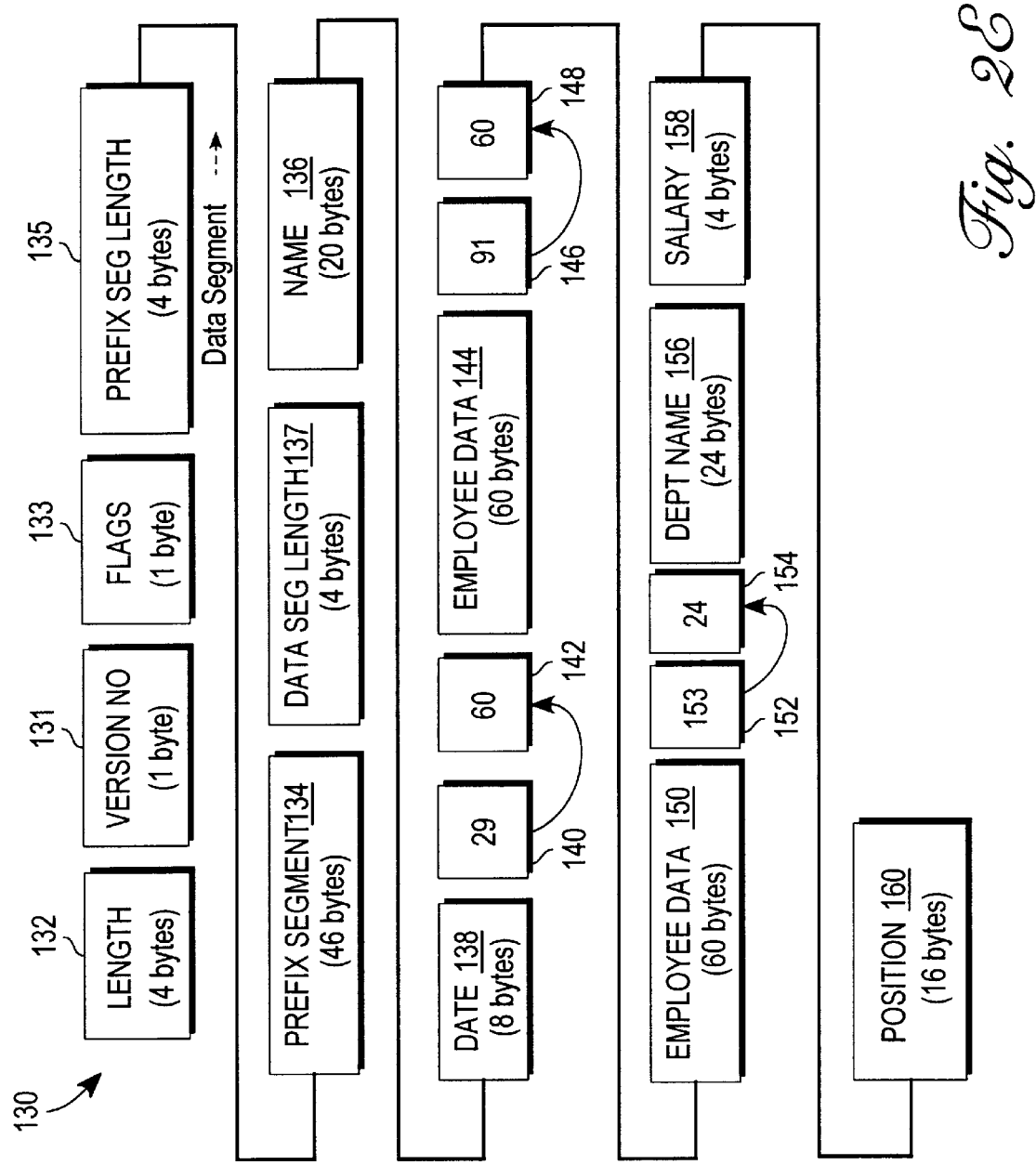
FIG. 2E is a diagram of a second image.

For example, FIG. 2E shows the structure of an image 130 constructed by the pickling mechanisms from an object of type Employee. The example of FIG. 2E assumes that, for an object of type Employee, characters are represented in one byte; Date types are stored in eight bytes; the value of Max_Supes is two; pointers are stored in four bytes; integers are stored in four bytes; and Dept_Names are stored in 24 bytes. The image 130 stores a Length value 132 in four bytes, which has a value of 258 as will be apparent from the following discussion. Following the Length value 132, the image 130 has a one-byte Version No value 131 that indicates the version number of the image. The function of the Version No value 131 is to enable the pickler to compare images rapidly. The image 130 also has a one-byte Flags value 133 that contains various flags stored as a bit pattern. The image 130 also has a Prefix Segment Length value 135, stored in four bytes, that indicates the number of bytes that are in the prefix segment 134. The four-byte prefix segment 134 also follows the Length value 132, and is defined, for this example, as having 46 bytes.

A data segment length value 137 is stored in four bytes, and indicates the length of a data segment that comprises the remainder of the image 130. The data segment comprises linearized data from the Employee object. The Name attribute is linearized in a Name string 136 of 20 bytes. The Date attribute is linearized in a Date string 138 of 8 bytes. The next attribute of the Employee object is Supervises, which is declared as an *Employee [1 . . . Max_Supes], i.e., an array of pointers to type Employee. Since Max_Supes has been resolved at compile time to the value two, two sets of Employee data 144, 150 are shown in image 130. The first pointer to Employee in the Supervises array is represented by a first logical pointer 140, a referenced length value 142, and first Employee data 144. The logical pointer 140 has a value of 29 that indicates that the referenced length value starts at an offset of 29 bytes from the start of the data segment of the image 130. In this example, the value of 29 is used because the sum of the lengths of the Name attribute (20 bytes), the Date attribute (8 bytes) and the pointer (1 byte) is 29. The referenced length value 142 has a value of 60 that indicates that an Employee object is stored in 60 bytes, using the storage assumptions set forth above. The first Employee data 144 is linearized data of the Employee object to which the first pointer in the Supervises array points.

Since the Supervises array contains circular references, the pickling mechanisms do not attempt to follow pointers in a referenced object. Rather, the data in an object referenced by a pointer is byte copied into the image.

A second logical pointer 146 is stored in image 130 to represent the second pointer in the Supervises array. The second logical pointer 146 has a value of 91 that indicates that the second length value 148 starts at an offset of 91 bytes from the beginning of the data segment. The second length value 148 also has a value of 60 to reflect the length of the second Employee data 150.

The next attribute of the Employee object is Department, which is declared as a pointer to Dept_Names. Accordingly, the image 130 stores a third logical pointer 152, a third length value 154, and department name data 156. The third logical pointer 152 has a value of 153, which indicates that the third length value 154 is at an offset of 188 bytes from the start of the data segment. The department name data 156 is followed by the fifth and sixth attributes of the Employee object, namely a Salary value 158 stored in four bytes and a Position value 160 stored in 16 bytes.

In total, the image 130 is stored in 258 bytes. Therefore, the value 258 is stored as the Length value 132.

As with the metadata, the image 130 is preferably stored in a device independent format as a string of unsigned single bytes.

Pickling Mechanisms

Figure 3A:
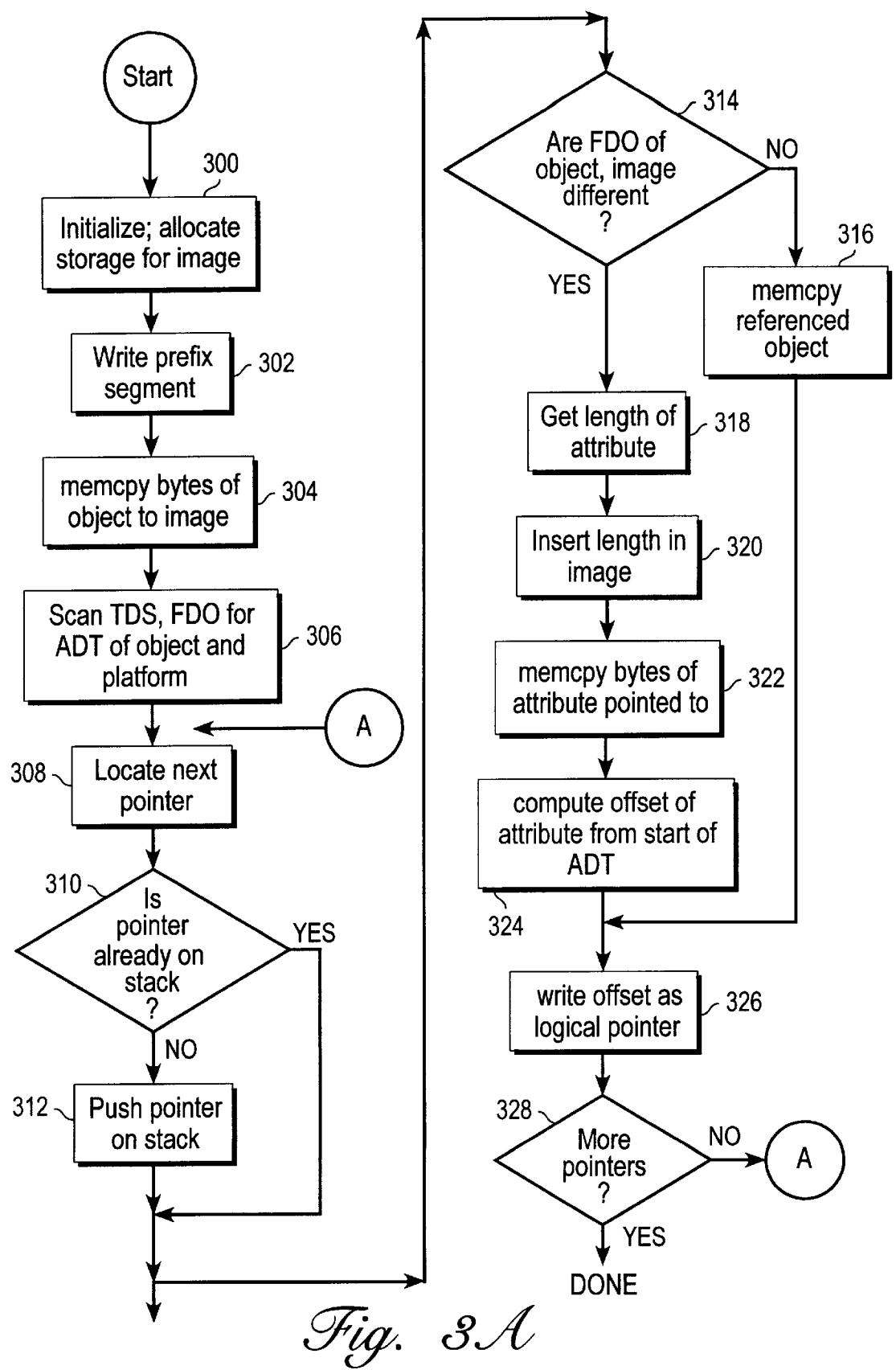
FIG. 3A is a flowchart of a data pickling process.

FIG. 3A is a flow diagram of a picklingmechanism in the form of a process. In step 300, initialization, the process allocates storage for an image. Step 300 may involve allocating disk space or space in a volatile memory so that an image of an object can be constructed in the allocated space. For example, step 300 preferably involves allocation of short-term or scratch memory that is used for a single function of the pickling process, and long-term memory that is allocated for the duration of a session. The initialization step also includes steps for setting up data structures and memory areas needed for internal processing purposes. For example, in some environments, implementation of the invention may require a callback structure to be established to identify and allocate space for functions and subroutines that are called by the pickler, and their parameters.

As part of the initialization step the process also constructs a Type Descriptor Segment for the object to be pickled, based on its abstract data type. The process obtains a Format Descriptor Object for the host system and for the object to be pickled. The Format Descriptor Objects can be received as parameters to a function that carries out the pickling process, or by reading them from a table of a database indexed to a code identifying the host system.

In step 302, the process writes a prefix segment of user-defined information in the image. Information for the prefix segment is passed to the pickling mechanism as a parameter.

In step 304, the process sequentially copies each byte of the object as represented in memory to the area allocated for the image, including physical pointers. In the preferred embodiment, step 304 is carried out using a "memcpy" function. The memcpy function is a C language library function. Preferably, step 304 also involves converting the format, alignment, and representation of the object to the format, alignment and representation used by the host system, before the object is byte copied into the image. For example, in step 304 the process compares the Format Descriptor Object of the object to the Format Descriptor Object of the image, and if they are different, the pickler carries out appropriate conversion of data formats, numeric data types (such as integers, floats, and doubles), alignment, size, character set, and representation. Character set conversion is carried out by calling external pre-defined functions that can perform string conversion. The Character Set information 50 and Character Set identifier 84 are provided to these functions.

Pointers require special processing. Therefore, in step 306, the process scans the Type Descriptor Segment and Format Descriptor Object for any pointers in the ADT of the object. For example, pointers are located by examining each opcode 48c of the Type Descriptor Segment 30 of the object. If an opcode 48c indicates that an attribute is a pointer type, the process finds that type in the OTS type names 72a, 72b, 72c, 72d, or 72e stored in the Format Descriptor Object. The corresponding platform-specific type name 74a, 74b, 74c, 74d, 74e in the Format Descriptor Object is examined to determine whether the type maps to a physical pointer. If so, the process has located the next pointer that forms part of the ADT, as shown in step 308.

In step 310, the process checks whether the name of the pointer, or a copy, is currently stored in a pointer stack that is stored in volatile memory accessible to the process. The pointer stack is maintained for the purpose of preventing endless loops that can arise in pickling circular references. Duplicate pointers are ignored and are not placed on the stack. If the pointer is not already on the stack, then in step 312, the process pushes a copy of the pointer onto the stack.

In step 314 the process tests whether the Format Descriptor Object of the object and the image are the same. In the preferred embodiment, Format Descriptor Objects for the object and the image are received by the pickling mechanism as parameters. If the Format Descriptor Objects are different, then in step 316 the "memcpy" function is used to copy the object referenced by the pointer to the image, and control is transferred to step 326. This approach is termed a "stop and copy" operation.

If the Format Descriptor Objects are the same, then in step 318 the process retrieves the length of the attribute that the pointer references, for example, by reading the Size attribute of a Type Descriptor Segment for the referenced ADT. In step 320, the length value is inserted into the image at a position just after the logical pointer. The process uses the offset information in the LDS and Type Descriptor Segment to locate the correct position to insert the length value. In step 322, the process sequentially copies the referenced object, preferably using the "memcpy" function, writing bytes of the referenced object into the image immediately after the length value. In step 324, the process computes the offset, in bytes measured from the start of the image, of the referenced object as represented in the image. In step 326, the process overwrites the physical pointer in the image with the offset value, which thereafter serves as a logical pointer to the bytes of the referenced object in the image.

Steps 318 to 326, in which a physical address pointer within an object is converted into an address-independent form within an image, carry out a process called "unswizzling" or "patching" a pointer. The process of converting an address-independent image pointer representation into a physical address within an object is known as "swizzling" a pointer. During pickling it is preferable to memcpy bytes of the object, and then unswizzle any pointers, because the memcpy function is fast and efficient. In one embodiment of the invention, physical pointers are processed in two passes through the object to be pickled. In one pass, the pointers are stacked in a pointer stack so that each pointer in the pointer stack is unique; in the second pass, each pointer in the stack is unswizzled and the image is adjusted accordingly.

In step 328, the process tests whether more pointers exist in the ADT of the object. If so, the process transfers control to step 308, and repeats the foregoing steps for the next pointer in the object.

Using these steps, physical address pointers are converted into a logical pointer, a length value, and the data that is referenced by the pointer. The process substitutes the actual offset for the physical address pointer, adds the length of the data that is pointed-to to the image, and copies bytes of the referenced data into the image. Circular references are handled using the pointer stack. When the image is complete, the image can be stored in a database table. Each ADT attribute in the image can be stored as a column of the table, or the entire pickled image is stored in a single column.

User Picklable Types

In some cases, an object referenced in an ADT or by a pointer in an ADT is impractical to pickle directly into an image. For example, a varying length array can be declared using the OTS varray type. The varray type has no predefined maximum length. An application program can declare a varray that is stored in a megabyte or more. Also, in the Oracle8 Server database system, an application program can declare a database table as an attribute of an ADT. Pickling an attribute of this size directly into an image (called "pickling inline") would result in an unduly large image that would impose an undue burden on a network when transported.

Figure 3B:
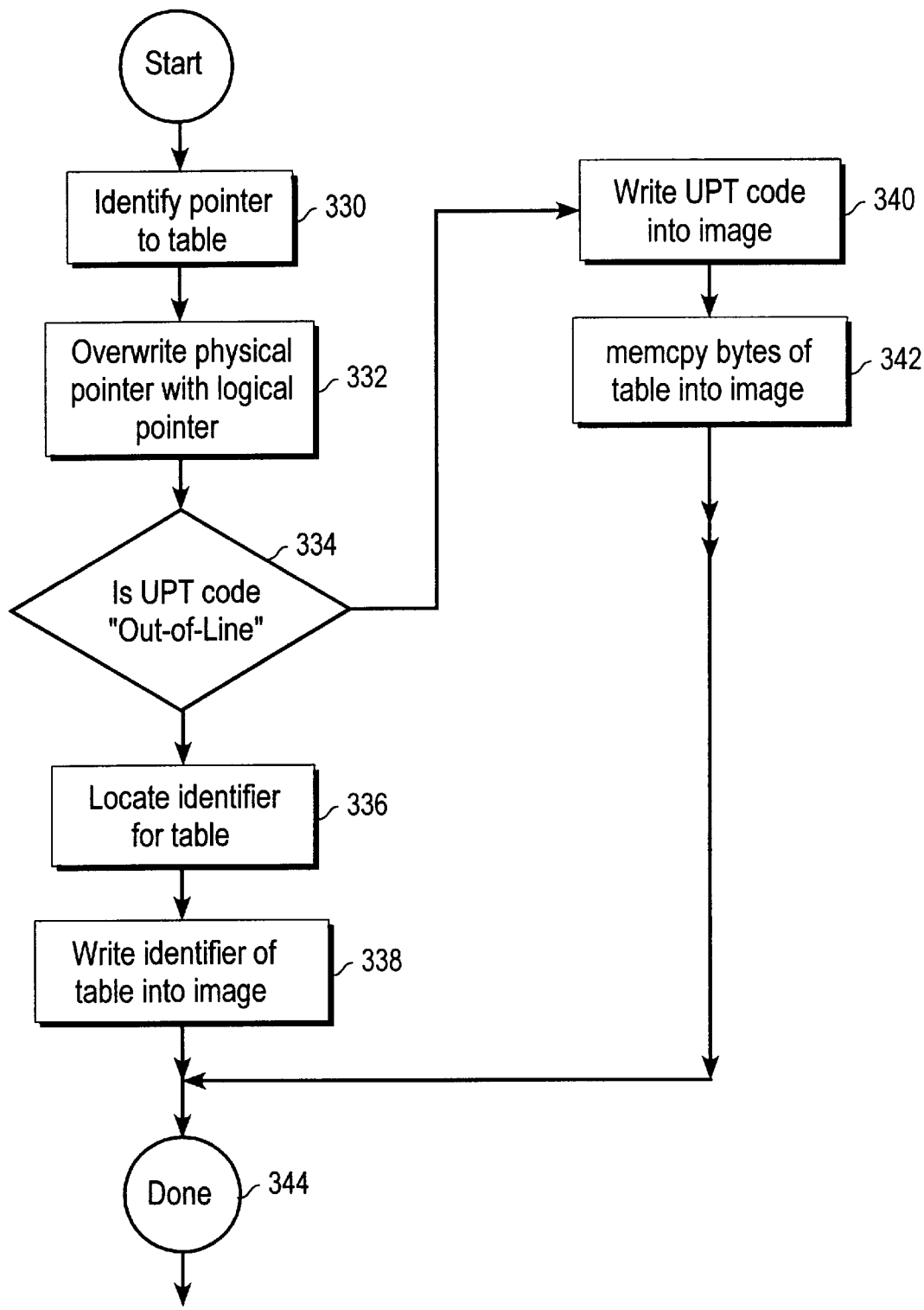
FIG. 3B is a flowchart of a process for pickling objects of abstract data types having user picklable types.

FIG. 3B is a flow diagram of a process that can be used to pickle large attributes such as tables, OTS varrays, and other attributes called "user picklable types." The process of FIG. 3B can be carried out as part of the process of FIG. 3A, for example, as part of step 308. The process of FIG. 3B assumes that an ADT or object containing a table or OTS varray has been copied into an image before the process of FIG. 3B is initiated.

In step 330, the process identifies a pointer that points to a table or varray. In step 332, the process overwrites the physical pointer with a logical pointer identifying the offset in the image of data representing the table or varray. When the ADT or object directly declares a table or varray, without using a pointer, steps 330 and 332 are not necessary.

In step 334 the process determines whether the table or varray is too large to be pickled inline. This test may be carried out by comparing the size of the table to a predetermined maximum size. Alternatively, and in the preferred embodiment, the Type Descriptor Segment for the ADT of the object contains a User Picklable Type (UPT) code that indicates that the attribute shall be pickled out of line. If the UPT code indicates that the attribute is a table to be pickled out of line, then in step 336 the process locates a unique table identifier for the table. For example, the Oracle8 Server database system, each database table is uniquely identified by a setid code. In step 338, the process writes the unique table identifier into the image. Thus, the pickler places a reference to the table in the image, rather than the table itself.

If the UPT code indicates that the table is to be pickled inline, then in step 340, the process writes the UPT into the image, to indicate that the following information is for an inline pickled attribute. In step 342, the process sequentially copies the attribute into the image, for example, using the "memcpy" function. The inline pickling process concludes at step 344.

Preferably, the UPT pickling process is carried out using a function or callback that is external to the pickler. The pickler passes to the function a set of parameters including the location in the image at which inline byte copying is to begin; the UPT opcode taken from the Type Descriptor Segment for the ADT that contains the collection; and a Type Descriptor Segment that identifies the collection. The function returns a length value identifying the number of bytes that were pickled; this value enables the pickler to continue pickling at a position immediately following the collection in the image. In the preferred embodiment, the function writes the length value in the image in four-byte canonical (big-endian) format.

Pickling ADTs that Contain Collections

An ADT can contain other ADTs or pointers to other ADTs. For example, one attribute of the Employee object of Table 1 is a Date object. In the Pascal language, the Date object may be declared as a complex ADT comprising the attributes of Table 3:

TABLE 3

EXAMPLE DATE ADT

| type | Date = Day: integer; |
|---|---|
| | Month: integer; |
| | Year: integer; |
| | Day_Of_Week: char[9]; |
| | Day_Count: integer. |

In this example, ADT Date is declared to have integer attributes to store the Day, Month, and Year, a character string to store the day of the week (Monday, Tuesday, etc.), and another integer to store the number of days that have elapsed since January 1. When a first ADT contains a second ADT that is sufficiently large and complex, it becomes more efficient to encode the second ADT in the image as a set of discrete attributes rather than a single long byte string. The second ADT is referred to as a "collection," and the encoded attributes of the collection are called a "collection image." A collection opcode is stored as the opcode 48c of the Type Descriptor Segment. When the pickling mechanism recognizes a collection opcode in the Type Descriptor Segment, it carries out collection image pickling as described below.

Figure 4A:
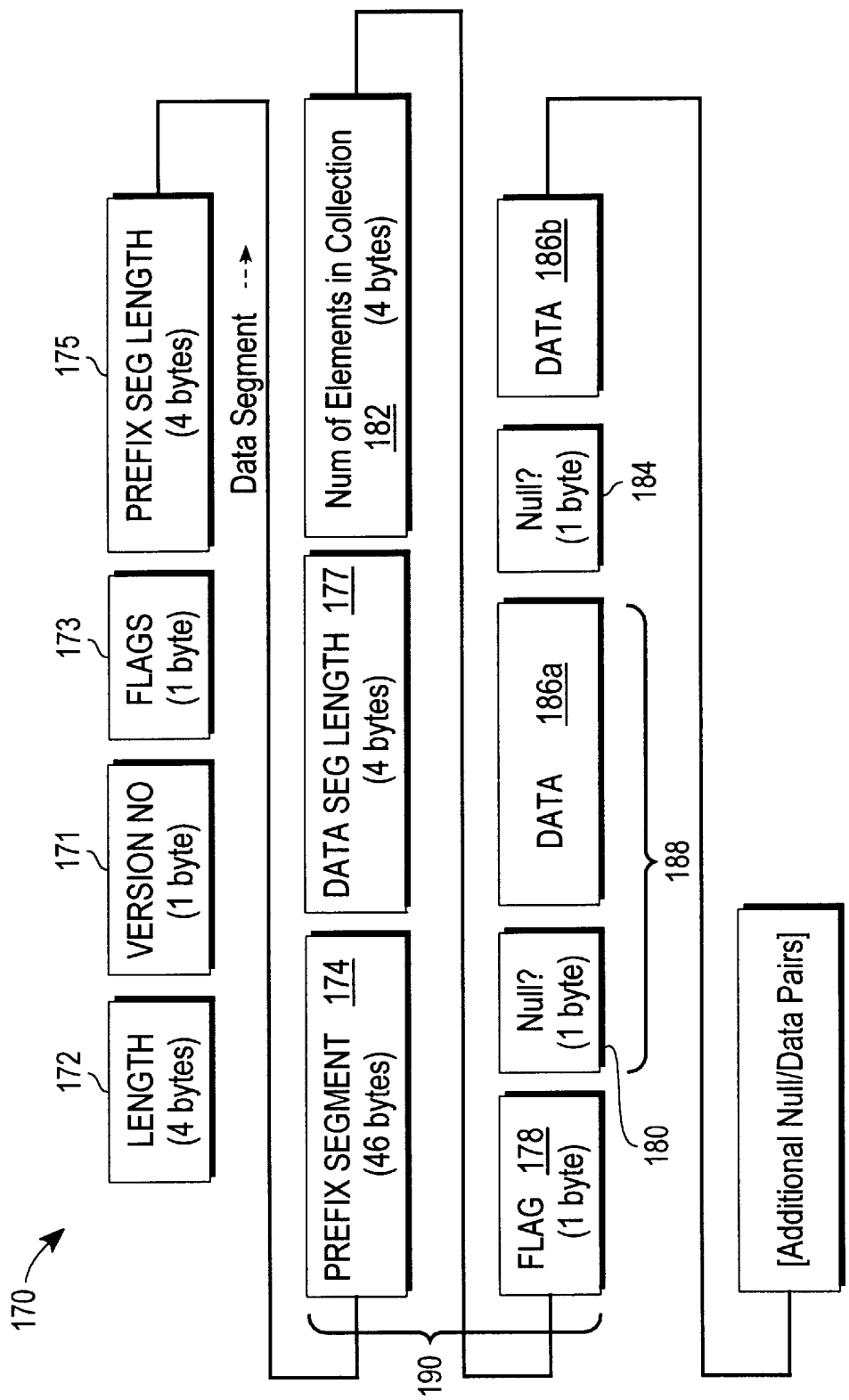
FIG. 4A is a diagram of a third image that contains a collection image.

FIG. 4A is a block diagram of an exemplary image 170 that contains a collection image 190. Generally image 170 has a structure similar to that of image 110 of FIG. 2D and image 130 of FIG. 2E. In particular, the image 170 has a length value 172, a version number value 171, a flags byte 173, a prefix segment length value 175, a prefix segment 174, and a data segment length value 177. The data segment of the image 170 includes a Number Of Elements In Collection value 182, a Flag byte 178, and pairs of null values and data 180, 186a and 184, 186b to the string of bytes 116 of FIG. 2D and the attributes of image 130 that follow prefix segment 134.

In the example of FIG. 4A, prefix segment 174 can store information defined by and useful to the application program that uses the pickling mechanisms.

The collection image has a Number Of Elements in Collection value 182 that indicates the number of attributes or elements 188 in the collection. For example, the ADT of Table 3 has five elements. Each of the elements 188 is represented in the image 190 by a Null value 180, 184 and a Data value 186a, 186b. The Data value 186a represents the contents of the first element 188 of the ADT. The Null value 184a indicates whether the Data value 186a is null. For the example of Table 3, assuming that integers are stored in four bytes, the Null value would store FALSE and the Data value 186a would store the value of the Day attribute. The same format of length followed by data is used for the second and other elements of the collection.

Each of the Data values 186a, 186b may be a collection image. The Data values 186a, 186b may be prefixed with a two-byte or four-byte length value indicating the number of bytes in the Data value.

Figure 4B:
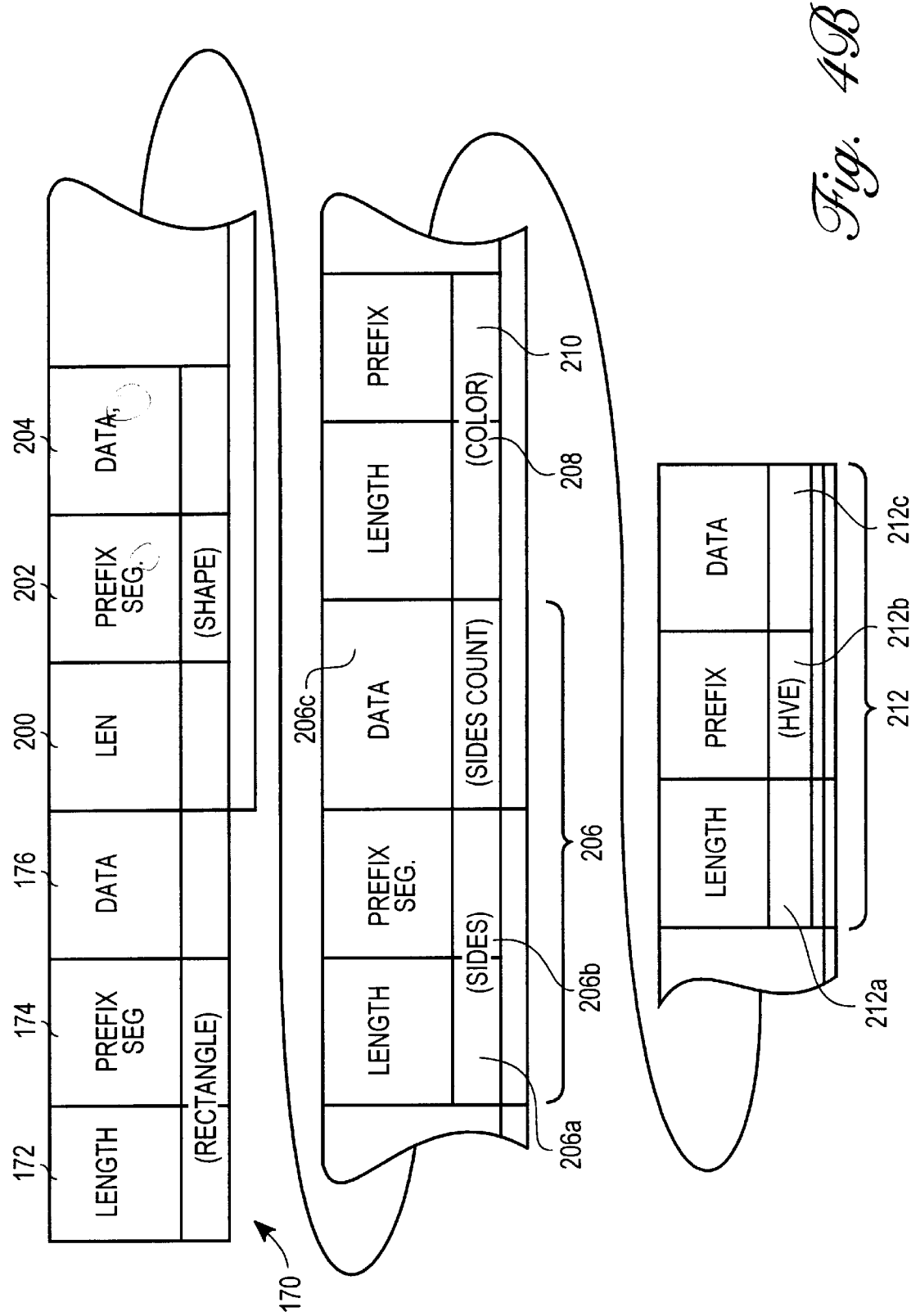
FIG. 4B is a diagram of a fourth image that contains a collection image.

FIG. 4B is a block diagram of an image 170 organized according to an alternative embodiment. In this example, the image 170 represents an ADT having the structure set by the following declarations:

| | | |
|---|---|---|
| type Rectangle = | Name: char[20]; | |
| | Shape: Polygon. | |
| type Polygon = | Child_Name: char[20]; | |
| | Sides: Side_Count; | {Attribute 1} |
| | Appearance: Color. | {Attribute 2} |
| type Side_Count = | (1,2,3,4). | |
| type Color = | Hue: (Red, Blue, Green). | {Attribute 2A} |

Thus, the ADT to be pickled is named Rectangle, and has two attributes. The second attribute of Rectangle is an ADT called Polygon that has three attributes. The first attribute, Child_Name, is as a simple type, namely a character string. The second and third attributes (Sides and Appearance) are declared as other ADTs. The ADT Polygon therefore defines a collection.

In the example of FIG. 4B, each ADT and attribute is stored in an image format. When the ADT Rectangle is pickled, its image is constructed in multiple conceptually nested images. The format of each image comprises a length, prefix segment, and data. The image 170 of FIG. 4B has an overall length value 172, a prefix segment 174, and a data segment 176, as in FIG. 4A. Because the Name attribute of Rectangle is a simple type, it is stored in the data segment 176 of FIG. 4B. Since the Shape attribute is declared as another ADT (Polygon), rather than writing data from a Polygon ADT into the data segment 176, the pickling mechanism writes a second length value 200 and a second prefix segment 202.

In the declaration of type Polygon, the first attribute Child_Name is a simple type, so its data is written into a second data segment 204 of image 170. The second attribute, Sides, is declared as an ADT Side_Count. Therefore, the pickling mechanism writes a third length value 206a and a third prefix segment 206b into the image 170. The ADT Side_Count is defined as a simple type, integer, so its data is written into a third data segment 206c. Thus, a collection image 206 nested within the image 170 represents the Side_Count attribute. The third attribute of type Polygon is Appearance, which is defined as an instance of ADT Color. Accordingly, the pickling mechanism writes a fourth length value 208 and a fourth prefix segment 210 in the image 170. The Color type declaration contains no simple types. Therefore, no data segment is written in association with the fourth length value 208 and fourth prefix segment 210. Because the Color type declaration refers to another ADT Hue, the pickler writes a fifth length value 212a and a fifth prefix segment 212b in the image 170, followed by a fifth data segment 212c representing the Hue information. The nested collection image 212 represents the Color information.

Using this recursive process, complex ADTs that refer to collections are efficiently pickled. This collection image pickling mechanism has the significant advantage that all embedded logical pointers reflect local offsets. For example, when a pointer is pickled in a deeply embedded collection image, the offset value may be small relative to the embedded collection image, but quite large relative to the entire image. If a different part of the image is modified, the offset values in all other collection images need not be changed. This greatly simplifies the process of managing large images.

In the preferred embodiment, byte offset values for each collection image are not stored. Therefore, in unpickling, the image must be read sequentially to identify each collection image. The process sequentially reads each length value, jumps to a byte position in the collection image that equals the current byte position plus the length value, reads the next length value, etc. This has the advantage of enabling the collection image to be written rapidly, with the tradeoff that a particular attribute within a collection image is not easily located. In an alternative embodiment, such byte offset values are stored in the image, as a header for each collection image, or the byte offset values are stored in a separate index having one offset value for each attribute of each collection image.

Pickling Objects That Have Inheritance

The pickling mechanisms described above use a Type Descriptor Segment for the ADT of the object to be pickled, a Format Descriptor Object for the image, and a Format Descriptor Object for the object to be pickled. An LDS is also used. The method of creating or receiving the LDS varies depending on whether the host language of the object enforces inheritance order and whether the object has, or could have, inheritance pointers. Preferably, the pickling mechanism creates the LDS when the object's host language has no inheritance pointer or inheritance order. Alternatively, when the host language of the object has inheritance ordering but no inheritance pointers, the LDS is obtained as a parameter to the pickler.

When the pickler is unpickling an object that has inheritance pointers, the LDS is obtained as a parameter to the pickler, and the pickler additionally receives a skeleton as a parameter. A skeleton is an empty instance of a class in which all inheritance pointers are properly set. An object needs a skeleton if the Type Descriptor Segment indicates that the ADT may have inheritance pointers and the Format Descriptor Object indicates that the host language has inheritance pointers. The pickling mechanism requests an external function to instantiate a skeleton each time that an object requiring an object is unpickled. The pickling mechanism passes the value of the Version No field 38 and the ADT Number 44 from the Type Descriptor Segment to the external function. This information enables the external function to construct a skeleton in the correct form.

Pickling the Format Descriptor Object or Type Descriptor Segment

In the preferred embodiment, the Format Descriptor Object and Type Descriptor Segment for an ADT are generated by a pickler function that is called by an application program before invoking pickling processing. Also preferably, the Format Descriptor Object and Type Descriptor Segment are pickled so that they can be transported in the prefix segment of an image with the image data. The pickling mechanism requires as parameters a Format Descriptor Object and Type Descriptor Segment describing the object to be pickled. Therefore, to pickle a Format Descriptor Object or Type Descriptor Segment, as input the pickling mechanism requires a second Format Descriptor Object and a second Type Descriptor Segment that describe the Format Descriptor Object or Type Descriptor Segment to be pickled. Interpreted strictly, the pickling mechanism would also require a Format Descriptor Object or Type Descriptor Segment for the second Format Descriptor Object and second Type Descriptor Segment, and so on ad infinitum. However, as described above, the Format Descriptor Object and Type Descriptor Segment are defined as having a canonical format and are stored in an array of octets. Accordingly, one embodiment includes Format Descriptor Object and Type Descriptor Segment objects that define the canonical format of a Format Descriptor Object or Type Descriptor Segment. These objects are designated Format Descriptor Object$_{CANONICAL}$ and Type Descriptor Segment$_{CANONICAL}$, or Format Descriptor Object$_C$ and Type Descriptor Segment$_C$, and are declared in the pickler as constants. They are loaded when the pickler initializes and provide a way to bootstrap construction of a Format Descriptor Object and Type Descriptor Segment.

Getting and Setting the Length of the Prefix Segment

The preferred embodiment includes auxiliary functions, which can be called from an application program, that allow the application program to get the number of bytes reserved by the pickler for a prefix segment, get bytes from within a prefix segment, and set bytes within a prefix segment.

Getting and Setting Attribute Values in an Image

It is desirable to integrate a pickler into a server or kernel portion of a database management system. For example, a pickler can be integrated into the Oracle8 Server database system. In such an environment, an application program or machine (called a client) requests functions to be performed by a server that contain, the database and basic functions for manipulating it. ADTs used by the client are pickled into an image, the image is sent to the server, and the server stores each ADT attribute of the image in a separate column of a database table. When stored in a table in this manner, the ADT is said to be in "exploded ADT format."

One approach to this process is to unpickle the image received from the client back into an object at the server, and then use native "object get" functions to move attributes or fields of the object into columns of the database table. In the preferred embodiment, the pickler has an image accessor function that can set the value of an attribute within an image, and an image constructor function that can get the value of an attribute from within an image. The image constructor function is used to send an ADT from the server to the client. Each table column is added to the image using an image constructor, and the image is then sent to the client. The image accessor and image constructor functions are passed a Type Descriptor Segment for the ADT, and a Format Descriptor Object for the platform.

Heterogeneous Host Language Support

An application program may need to pickle and unpickle objects created using more than one programming language. For example, an application program may need to support both C and C++ objects in the same program, or to unpickle the same image of an ADT into both a C object and a C++ object. In the preferred embodiment, at compile time, the application program links in a pickler library routine that generates a default Format Descriptor Object 60 for one platform, e.g., one of the two or more programming languages. The library routine executes when the pickler initializes. There is one Format Descriptor Object 60 per platform per session, which acts as a default Format Descriptor Object. A second library routine is also linked in at runtime to enable a second Format Descriptor Object 60 to be generated for the second programming language. In one embodiment, the second library routine is marked as non-default, and stored in non-volatile memory. The second library routine is invoked to create the second Format Descriptor Object 60 when the second Format Descriptor Object is needed for the first time. In another embodiment, the second library routine is marked as non-default, immediately executed so that the second Format Descriptor Object 60 is created in memory, and the second Format Descriptor Object is then stored in non-volatile memory, and retrieved when needed.

Representation of Discriminated Unions and Substitutable ADT Attributes

Certain OTS types are determined at runtime. For example, when an OTS type or an ADT has a discriminated union or "dunion", the value of the discriminant determines the data in the union, and the discriminant value is resolved at runtime. Unions are type constructs integral to several programming languages such as C. For example, unions are disclosed in B. Kernighan et al., "The C Programming Language" (Englewood Cliffs, N.J.: Prentice-Hall, Inc., 1978), section 6.8. Further, in ADTs that have substitutable attributes, an attribute may be a subtype of the type declared for the attribute. In these cases, special pickling processing is used.

In the Open Type System, a pointer to a separate object that is the value of the union represents a dunion. The value of the union's discriminant is separately stored. Accordingly, during pickling, dunions are pickled in the same manner as for pointers. The dunion is stored in a Type Descriptor Segment and pickled as a pointer to a type T, where T is the type of the value of the union, and T is stored with the primary object. In one embodiment, the application program expresses a union construct as a pointer to T rather than as a union that includes T.

In one embodiment, the pickling mechanism supports substitutable attributes. An example of a type with a substitutable attribute is an ADT car that has an attribute driver of type person. Type person has subtypes chauffeur and taxi_ driver. In a particular instance of car the driver attribute is declared as type chauffeur. The pickler detects at runtime that the driver is not a person but rather a chauffeur. The substitutable ADT attribute person is represented as a pointer to T, in which T is the type. The first field of T pointed to from the object is a discriminant, which is a pointer to the actual type. In this way, the pickler can determine where to find the type of the pointed-to object.

Unpickling Mechanisms

Figure 3C:
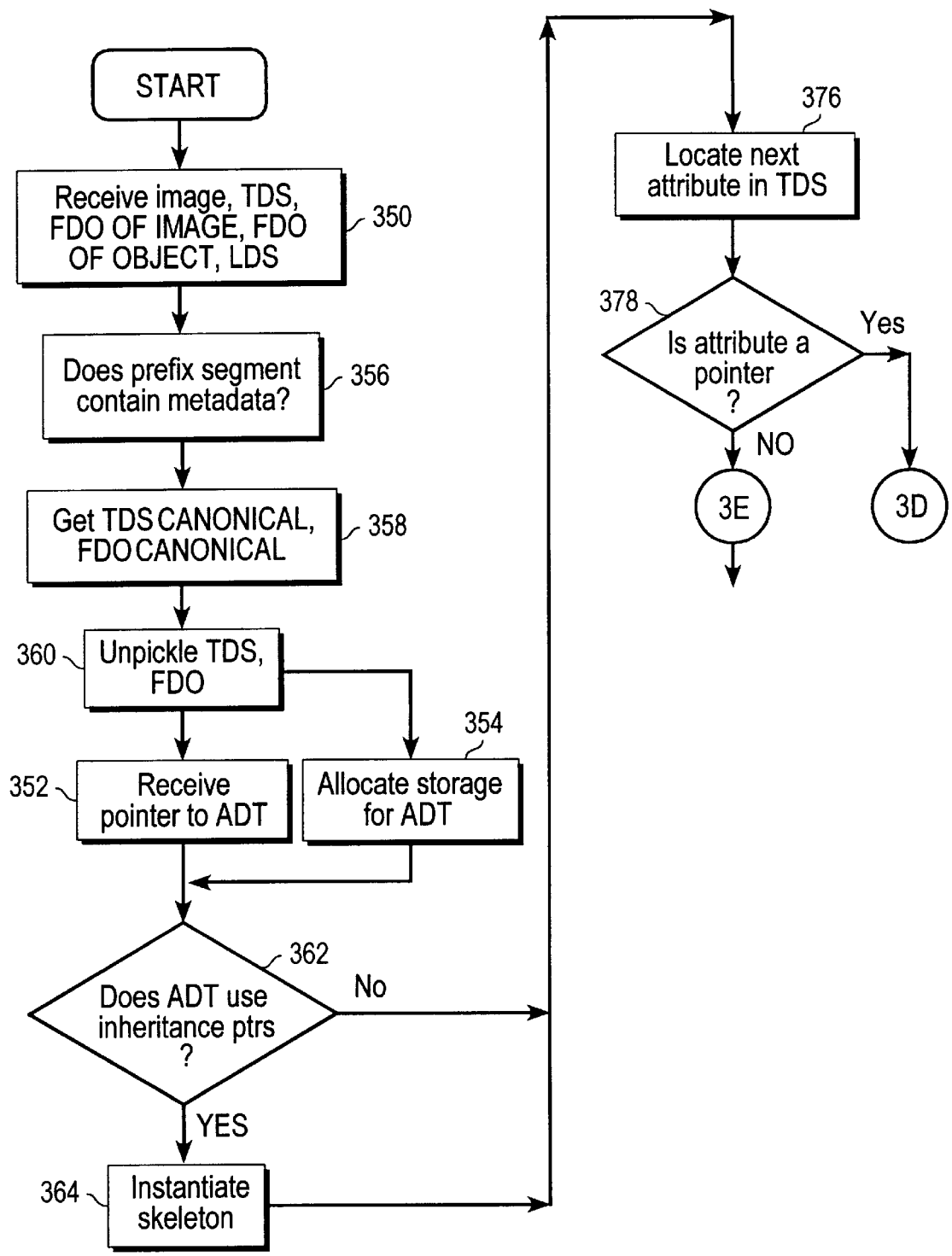
FIG. 3C is a flowchart of an unpickling process.
Figure 3D:
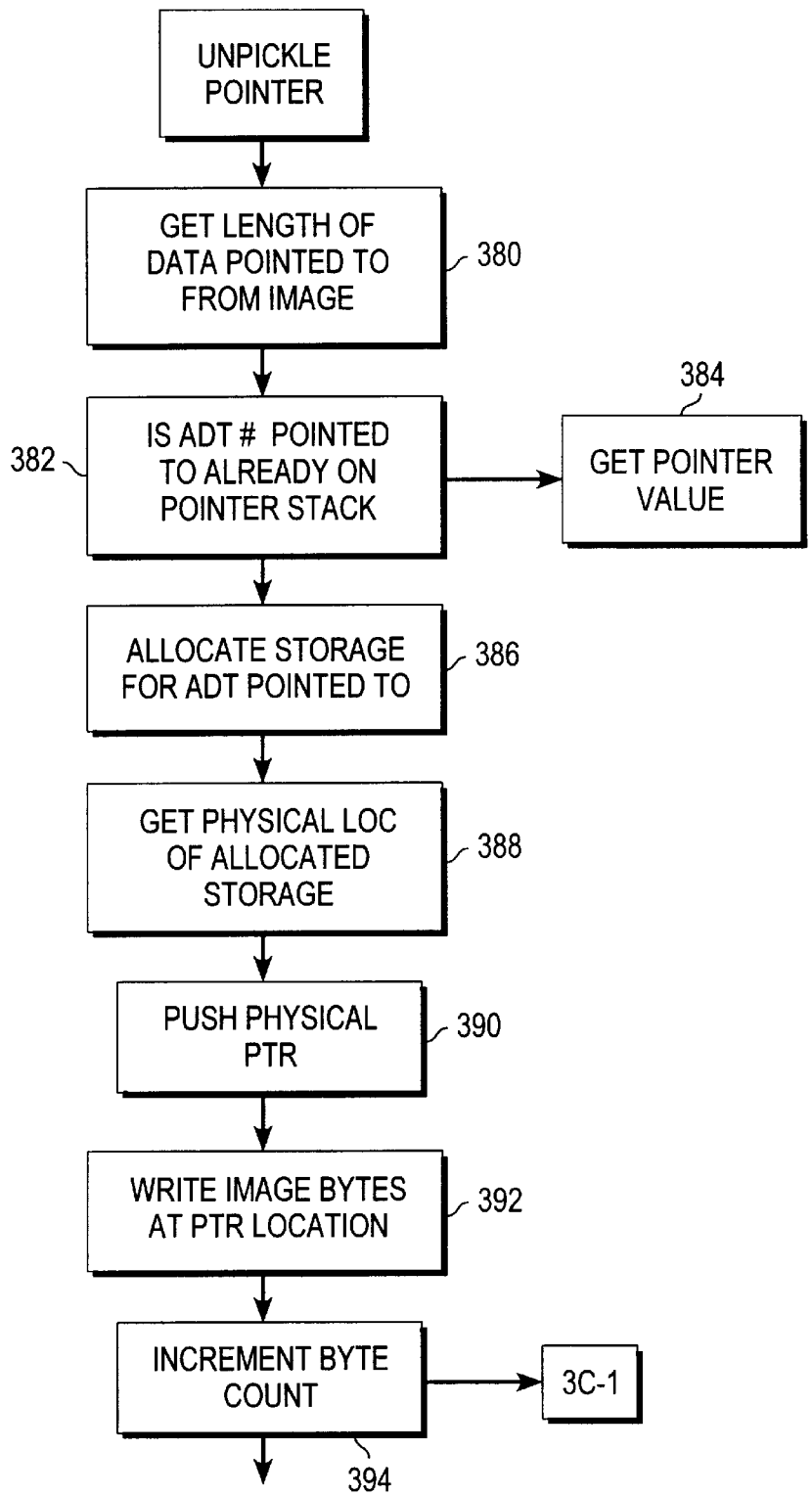
FIG. 3D is a flowchart of a process of unpickling pointers.
Figure 3E:
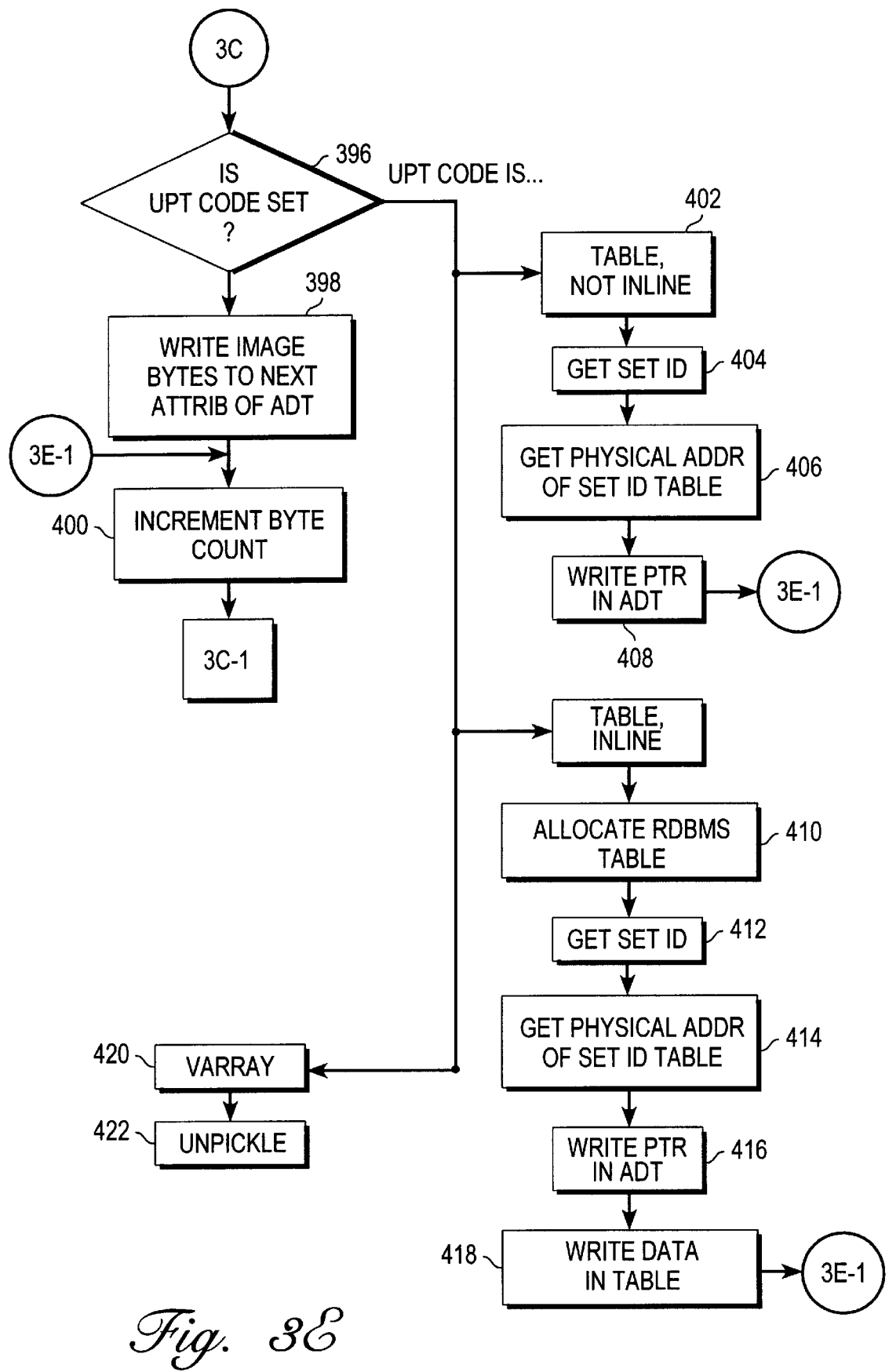
FIG. 3E is a flowchart of a process of unpickling tables and arrays.

FIG. 3C, FIG. 3D, and FIG. 3E show aspects of the unpickling mechanism 10 shown in FIG. 1, in the form of processes. In the unpickling mechanism 10, an image 6 is read sequentially and rebuilt into object 2 that is an instance of the ADT defined by the image, in a manner that mirrors the picklingmechanism.

When the unpickling mechanism is invoked, in step 350 a process receives the image, a Type Descriptor Segment and Format Descriptor Object of the image, and a Format Descriptor Object of the object. In one embodiment, the image and the metadata that describes the image are received as parameters to a function call that implements the unpicklingmechanism. In an alternate embodiment, the metadata is embedded in the image, for example, in the prefix segment. As shown in step 356, in this embodiment the process tests whether the prefix segment contains the metadata. If so, in step 358 the process retrieves canonical metadata Type Descriptor Segment$_{CANONICAL}$ and Format Descriptor Object$_{CANONICAL}$ that describes the organization and format of the metadata in the prefix segment. Using this metadata, the process unpickles the prefix segment into a usable Type Descriptor Segment and Format Descriptor Object that are stored in memory.

In one embodiment, the process then allocates storage in main memory for the ADT that will be unpickled from the image. This is done by examining the Type Descriptor Segment to identify the size of the ADT, and allocating that number of bytes in main memory. Alternatively, as shown in step 352, the process receives a pointer to a previously allocated or instantiated object that has the same ADT. This enables the process to re-use objects and memory. When passed a pointer to an ADT that is already allocated in memory, and the pickler will unpickle the image to the referenced location. This avoids memory re-allocation, improving efficiency.

In step 362, the process examines the Inheritance Flags of the Type Descriptor Segment to determine whether the ADT uses inheritance pointers. If so, in step 364 the process instantiates a skeleton of the ADT that has all inheritance pointers properly set. Preferably this is done by an external function call.

The next attribute in the image is looked up in the Type Descriptor Segment, in step 376. In step 378, the process tests whether that attribute is a pointer. If it is a pointer, it is unpickled according to the steps shown in FIG. 3D.

In an image, a physical pointer to an object is represented as a logical pointer, a length of the object, and data from the object. In step 380, the process reads the length of the object from the image. In step 382, the process tests whether the object pointed to is already represented on a pointer stack stored in association with the process. If so, the physical address of the object is retrieved from the pointer stack in step 384. Through steps 382, 384, the process avoids creating a duplicate pointer for an identical object that is referenced more than once in an ADT.

In step 386, the process allocates storage for the ADT referenced by the pointer. In step 388, the process retrieves the physical memory address of the allocated storage. The physical address value becomes a physical pointer that replaces the logical pointer of the image. The process pushes the physical pointer onto the stack in step 390. In step 392, starting at the location indicated by the logical pointer, the process writes bytes from the image into the ADT at the location identified by the physical pointer. As this is done, in step 394 the byte counter is incremented. When the ADT has been completely copied, control returns to step 370 so that the next attribute may be processed.

FIG. 3E is a flow diagram of steps carried out when the attribute in the image is not a pointer. In step 396, the process tests whether a UPT code is set in the Type Descriptor Segment for the attribute. If not, then the attribute's information can be written directly into the ADT, which is done in step 398. In step 400, the byte counter is incremented, and control returns to step 370 so that the next attribute may be processed.

Otherwise, the UPT code is interpreted to determine whether the attribute is a nested table or varray. If the UPT code indicates that the attribute is a table that was not pickled inline, as shown in step 402, then in step 404 the process retrieves a unique identifier for the table. The table identifier is a reference to the logical location of the table in memory. The process follows the table identifier to locate the table. When it is located, the process loads the address of the table, in step 406. The address, and other information about the table, are stored in a collection structure. A logical pointer to the collection structure is stored in the ADT attribute corresponding to the table.

If the UPT code indicates that the attribute is a table that was pickled inline, in step 410 the process allocates space for a new table in a database management system associated with the process. This provides a place in which data from the image can be written. In step 412, the process retrieves the setid for the just-allocated table, and obtains its address in step 414. The address, and other information about the table, are stored in a collection structure. A logical pointer to the collection structure is stored in the ADT attribute corresponding to the table in step 416. In step 418, data from the image is written into the new table.

The UPT code may have two other values, indicating that the image contains a varray pickled inline or a varray pickled out-of-line. These codes are interpreted in block 420 and the varray is unpickled in block 422. When block 420 determines that the image contains a varray that is pickled in-line, then data values for the elements of the array are byte-copied from the image into the ADT that has been constructed using the metadata in the image. When block 420 determines that the image contains a varray that is pickled out-of-line, then the image will contain an identifier of the varray, such as a setid, and a reference to a secondary data structure (such as a table or tree) that stores values of elements of the varray. The reference is followed to locate the secondary data structure. Data values for elements of the varray are loaded from the secondary data structure, using the identifier or setid as a key. The data values are loaded into a varray structure that has been created using the metadata in the image.

Images that contain collection images may be unpickled by using the foregoing process in a recursive manner for each collection within the image.

Hardware Overview

Figure 5:
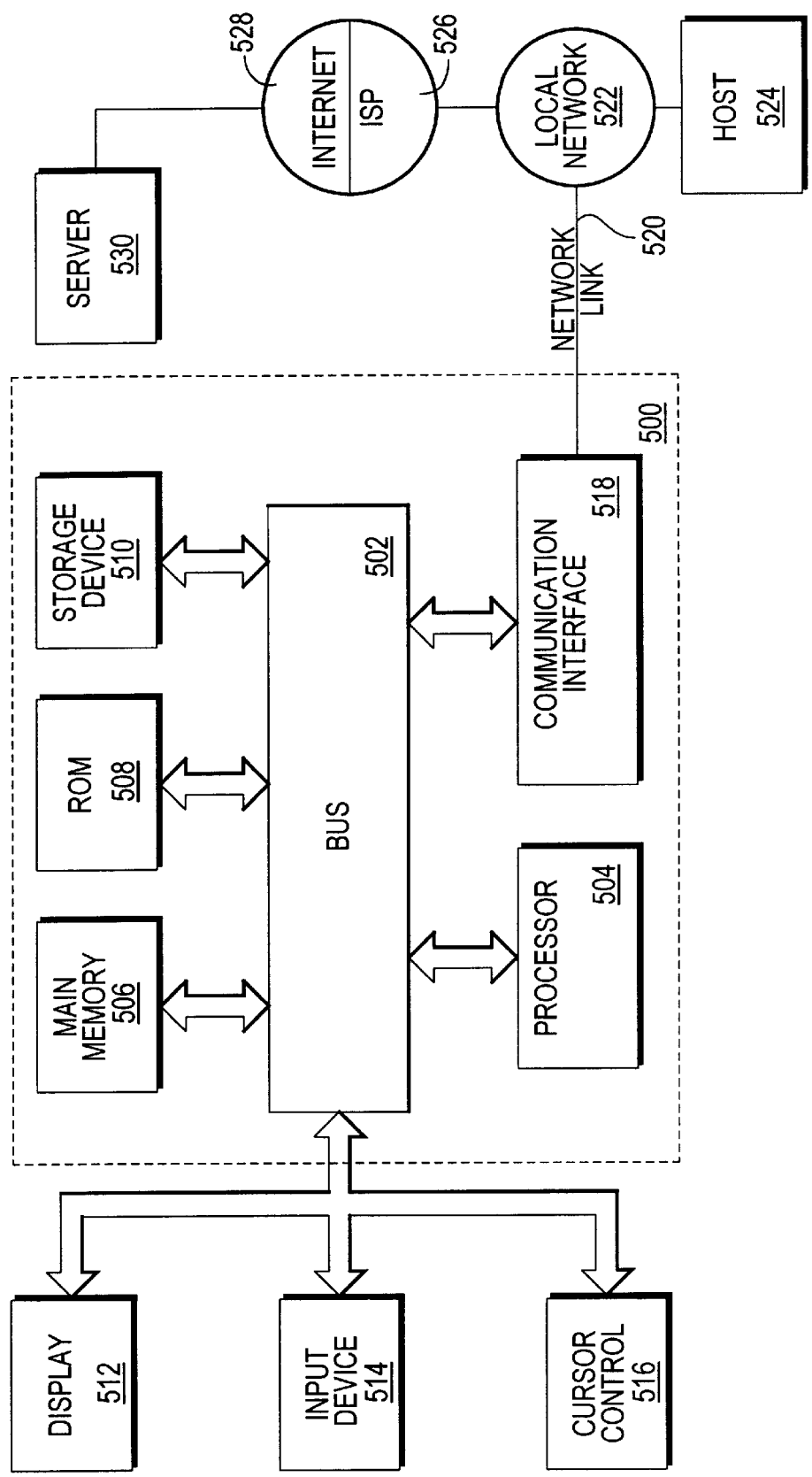
FIG. 5 is a block diagram of a computer system that can be used to implement the present invention.

FIG. 5 is a block diagram of a computer system 500 upon which an embodiment of the present invention can be implemented. Computer system 500 includes a bus 501 or other communication mechanism for communicating information, and a processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502. Data storage device 507 is coupled to bus 501 for storing information and instructions.

A data storage device 507 such as a magnetic disk or optical disk and its corresponding disk drive can be coupled to computer system 500. Computer system 500 can also be coupled via bus 501 to a display device 521, such as a cathode ray tube (CRT), for displaying information to a computer user. Computer system 500 further includes a keyboard 522 and a cursor control 523, such as a mouse.

Computer 500 also includes a communication interface 518 coupled to bus 502. Communication interface 508 provides a two-way data communication coupling to a network link 520 to a local network 522. For example, if communication interface 518 is an integrated services digital network (ISDN) card or a modem, communication interface 518 provides a data communication connection to the corresponding type of telephone line. If communication interface 518 is a local area network (LAN) card, communication interface 518 provides a data communication connection to a compatible LAN. Wireless links are also possible. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals, which carry digital data streams. The signals through the various networks and the signals on network link 520 and through communication interface 518, which carry the digital data to and from computer 500 are exemplary forms of carrier waves transporting the information.

Computer 500 can send messages and receive data, including program code, through the network(s), network link 520 and communication interface 518. In the Internet example, a server 530 might transmit a requested code for an application program through Internet 528, ISP 526, local network 522 and communication interface 518. In accord with the invention, one such downloaded application is the pickler, pickling process and unpickling process described herein.

Processor 504 may execute the received code as it is received, and/or stored in storage device 510, or other non-volatile storage for later execution. In this manner, computer 500 may obtain application code in the form of a carrier wave.

The present invention is related to the use of computer system 500 to pickle and unpickle data objects and images. According to one embodiment, pickling and unpickling is performed by computer system 500 in response to processor 502 executing sequences of instructions contained in memory 504. Such instructions may be read into memory 504 from another computer-readable medium, such as data storage device 507. Execution of the sequences of instructions contained in memory 504 causes processor 502 to perform the process steps that will be described hereafter. In alternative embodiments, hard-wired circuitry may be used in place of or in combination with software instructions to implement the present invention. Thus, the present invention is not limited to any specific combination of hardware circuitry and software.

Alternatives and Extensions

Accordingly, a pickler comprising a pickling mechanism, an unpickling mechanism, and supporting metadata has been described. The pickler has numerous uses and applications of pickling. For example, the pickler can be used to linearize data to facilitate transporting the data across a network of heterogeneous computers. Also, extensions of the invention and the embodiments disclosed herein are contemplated. For example, the pickler can be configured to pickle objects that combine ADTs or data and methods, such as C++ objects or Java objects.

Further, a pickler and unpickler may be integrated into a Java virtual machine operating in a client that is connected to a server across a network, including across a network operating using the Hypertext Transfer Protocol (HTTP). For example, a pickler is available in an application server that provides World Wide Web applications and services. A client running a browser connects to the server, using HTTP. The browser incorporates a Java language virtual machine so that it can execute Java applets that are embedded in a Web page received from the server. The pickler is integrated into the Java virtual machine, or operates as a plug-in to the browser. Pickled data is transported across a network to the client, unpickled in the client or in the browser, and executed in a Java program running in the client.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

In particular, while the invention has been described and illustrated with respect to particular examples of data types and ADTs, the invention is not restricted to the examples given.

What is claimed is:

1. A method of pickling a data object into an image, comprising the steps of:

storing in a computer memory, type metadata that describes an abstract data type of said data object;

storing in said computer memory, format metadata that describes a data format used by said data object;

copying a plurality of bytes of said data object into said image, according to information contained in said type metadata; and transforming an address pointer of said data object into a memory offset value in said image using said type metadata and said format metadata, and copying into said image a second plurality of bytes to which said pointer points.

2. The method recited in claim 1, further comprising the steps of:

receiving in said computer memory a type version value of an abstract data type; and carrying out said steps of copying and transforming only if said type version value matches a second type version value in said type metadata.

3. The method recited in claim 1, wherein the step of converting said address pointer further comprises the step of storing a length of said second plurality of bytes in said image.

4. The method recited in claim 1, further comprising the steps of transforming an attribute of said data object that is in a non-canonical format into a canonical attribute, and storing said canonical attribute in said image.

5. The method recited in claim 1, further comprising the step of transforming into said image at least one of an integer type attribute and float type attribute of said data object into a canonical attribute, and storing said canonical attribute in said image.

6. The method recited in claim 1, further comprising the step of transforming an alignment of an attribute of said data object into a second alignment compatible with said image.

7. The method recited in claim 1, further comprising the step of transforming a character set of an attribute of said data object into said image.

8. The method recited in claim 1, wherein said step of converting an address pointer includes the step of computing said memory offset value using said type metadata and said format metadata.

9. The method recited in claim 1, wherein the step of storing said type metadata further comprises the step of storing a status flag representing an inheritance characteristic of said data object, a code representing an abstract data type attribute of said data object, and a character set identifier that identifies a character set of said data object, in said type metadata.

10. The method recited in claim 1, wherein the step of storing said format descriptor object further comprises the step of storing a network format identifier that identifies alignment characteristics of said data object, a layout representation identifier that identifies a data layout of said data object, a character set identifier that identifies a character set of said data object, and an inheritance flag indicating an inheritance property of said data object, in said format descriptor object.

11. The method recited in claim 1, further including the step of storing location metadata associated with said data object that comprises a byte offset value of each attribute of said data object.

12. The method recited in claim 1, wherein the step of copying further comprises the step of storing in said image a prefix segment, a plurality of bytes copied from said data object, and a logical pointer.

13. The method recited in claim 1, wherein the step of copying comprises the steps of:

storing in said image information that represents a length of said image;

storing a reserved data area in said image; and copying a plurality of bytes of said data object into said image at a location after said information and said reserved data area, and according to said type metadata.

14. The method recited in claim 12, further comprising the steps of:

receiving a value defining a length of said prefix segment; and allocating a quantity of said computer memory sufficient to contain said prefix segment.

15. The method recited in claim 1, further comprising the step of:

when said data object contains an attribute defined by a discriminated union, converting a second address pointer of said discriminated union into a memory offset value in said image, and copying into said image a third plurality of bytes to which said second address pointer points.

16. The method recited in claim 1, wherein said data object comprises a plurality of attributes, and further comprising the step of:

repeating said copying step and said converting step for each of said plurality of attributes.

17. The method recited in claim 1, further comprising the steps of:

when said data object contains a data collection, storing information in said image and in said type metadata indicating that said data collection is pickled inline;

converting a nested collection pointer that points to said data collection into a logical pointer stored in said image; and storing in said image a collection identifier that indicates a memory location of said data collection.

18. The method recited in claim 1, further comprising the steps of:

when said data object contains a nested data collection, storing information in said type metadata indicating that said nested data collection is pickled out-of-line;

storing a nested data collection opcode in said type metadata; and copying a third plurality of bytes of said nested table into said image.

19. The method recited in claim 1, further comprising the steps of:

when said data object contains a plurality of attributes, each attribute being a complex abstract data type, storing in said image a linearized collection image that represents said plurality of attributes; and for each of said plurality of attributes, storing in said linearized collection image an ADT image that is a linearized representation of said attribute.

20. The method recited in claim 19, wherein the step of storing an ADT image comprises the step of storing a prefix segment and a linear string of bytes as said ADT image.

21. The method recited in claim 20, further comprising the step of storing in said type metadata an offset value representing a quantity of bytes by which one of said plurality of attributes is offset from a first attribute of said data object.

22. The method recited in claim 1, further comprising the steps of:

pushing said address pointer of said data object onto a stack of ADT pointers;

when a second address pointer of said data object is equal to an ADT pointer in said stack, pushing said second address pointer onto said stack; and converting each ADT pointer in said stack into a memory offset value in said image according to said type metadata and said format metadata, and copying into said image a second plurality of bytes to which each said ADT pointer points.

23. A method of unpickling an image into a data object, comprising the steps of:

reading, from a computer memory, type data describing inheritance characteristics, attributes, and an attribute character set of an abstract data type of said data object;

allocating an area in said computer memory sufficient to store said data object;

reading a plurality of bytes from said image;

transforming said plurality of bytes into an attribute of an abstract data type of said data object according to said type data for said data object; and storing said attribute into said area.

24. The method recited in claim 23, further comprising the step of reading said type data from a prefix segment of said image.

25. The method recited in claim 23, wherein the step of reading type data comprises the step of reading, from a table of a database system, type data describing inheritance characteristics, attributes, and an attribute character set of an abstract data type of said data object.

26. A method of setting an attribute within an image of a data object to a value, comprising the steps of:

storing type data describing an attribute character set of an abstract data type of said data object;

reading an offset of said attribute within said image from said type data;

locating said attribute in said image according to said offset; and storing said value in said image at said offset.

27. The method recited in claim 26, wherein the step of storing said value further comprises the step of transforming said value into a linearized byte format.

28. The method recited in claim 26, further comprising the step of:

reading said type data from a prefix segment of said image.

29. A computer software product that includes a medium readable by a processor, the medium having stored thereon a sequence of instructions which, when executed by said processor, causes said processor to pickle a data object into an image by causing said processor to execute the steps of:

generating and storing a type descriptor segment describing a data object and a format descriptor object that describes a data format used by a host computer system;

copying a plurality of bytes of said data object into said image in a computer memory, according to information contained in said type descriptor segment; and if said data object contains a pointer, transforming an address pointer of said data object into a memory offset value in said image using said type descriptor segment and said format descriptor object, and copying into said image a second plurality of bytes to which said pointer points.

30. The computer software product recited in claim 29, wherein said sequence of instructions further causes said processor to execute the steps of:

receiving in said computer memory a type version value of an abstract data type; and carrying out said steps of copying and transforming only if said type version value matches a second type version value in said type descriptor object.

31. The computer software product recited in claim 29, wherein said sequence of instructions further causes said processor to execute the steps of converting said address pointer further comprises the step of storing a length of said second plurality of bytes in said image.

32. The computer software product recited in claim 29, wherein said sequence of instructions further causes said processor to execute the steps of transforming an attribute of said data object that is in a non-canonical format into a canonical attribute, and storing said canonical attribute in said image.

33. The computer software product recited in claim 29, wherein said sequence of instructions further causes said processor to execute the step of transforming into said image at least one of an integer type attribute and float type attribute of said data object into a canonical attribute, and storing said canonical attribute in said image.

34. The computer software product recited in claim 29, wherein said sequence of instructions further causes said processor to execute the step of transforming an alignment of an attribute of said data object into said image.

35. The computer software product recited in claim 29, wherein said sequence of instructions further causes said processor to execute the step of transforming a character set of an attribute of said data object into said image.

36. The computer software product recited in claim 29, wherein said sequence of instructions further causes said processor to execute the step of computing said memory offset value using said type descriptor segment and said format descriptor object.

37. The computer software product recited in claim 29, wherein said sequence of instructions further causes said processor to execute the steps of storing a status flag representing an inheritance characteristic of said data object, an opcode representing an abstract data type attribute of said data object, and a character set identifier that identifies a character set of said data object, in said type descriptor segment.

38. The computer software product recited in claim 29, wherein said sequence of instructions further causes said processor to execute the steps of storing a network format identifier that identifies alignment characteristics of said data object, a layout representation identifier that identifies a data layout of said data object, a character set identifier that identifies a character set of said data object, and an inheritance flag indicating an inheritance property of said data object, in said format descriptor object.

39. The computer software product recited in claim 29, wherein said sequence of instructions further causes said processor to execute the step of storing a location descriptor segment associated with data object that comprises a byte offset value of each attribute of said data object.

40. The computer software product recited in claim 29, wherein said sequence of instructions further causes said processor to execute the step of storing in said image a prefix segment, a plurality of bytes copied from said data object, and a logical pointer.

41. The computer software product recited in claim 29, wherein said sequence of instructions further causes said processor to execute the steps of:

storing in said image information that represents a length of said image;

storing a reserved data area in said image; and copying a plurality of bytes of said data object into said image at a location after said information and said data area, and according to said type descriptor segment.

42. The computer software product recited in claim 41, wherein said sequence of instructions further causes said processor to execute the steps of:

receiving a value defining a length of said prefix segment; and allocating a quantity of said computer memory sufficient to contain said prefix segment.

43. The computer software product recited in claim 29, further comprising the step of, when said data object contains an attribute defined by a discriminated union, converting a second address pointer of said discriminated union into a memory offset value in said image, and copying into said image a third plurality of bytes to which said pointer points.

44. The computer software product recited in claim 29, wherein said sequence of instructions further causes said processor to execute the step of repeating said copying step and said converting step for each of a plurality of attributes in said data object.

45. The computer software product recited in claim 29, wherein said sequence of instructions further causes said processor to execute the steps of:

when said data object contains a data collection, storing information in said image and in said type descriptor segment indicating that said data collection is pickled inline;

converting a nested collection pointer that points to said data collection into a logical pointer stored in said image; and storing in said image a collection identifier that indicates a memory location of said data collection.

46. The computer software product recited in claim 29, wherein said sequence of instructions further causes said processor to execute the steps of:

when said data object contains a nested data collection, storing information in said type descriptor segment indicating that said nested data collection is pickled out-of-line;

storing a nested data collection opcode in said type descriptor segment; and copying a third plurality of bytes of said nested table into said image.

47. The computer software product recited in claim 29, wherein said sequence of instructions further causes said processor to execute the steps of:

when said data object contains a plurality of attributes, each attribute being a complex abstract data type, storing in said image a linearized collection image that represents said plurality of attributes; and for each of said plurality of attributes, storing in said linearized collection image an ADT image that is a linearized representation of said attribute.

48. The computer software product recited in claim 47, wherein said sequence of instructions further causes said processor to execute the steps of storing an ADT image comprises the step of storing a prefix segment and a linear string of bytes as said ADT image.

49. The computer software product recited in claim 29, wherein said sequence of instructions further causes said processor to execute the steps of storing in said type descriptor segment an offset value representing a quantity of bytes by which one of said plurality of attributes is offset from a first attribute of said data object.

50. The computer software product recited in claim 29, wherein said sequence of instructions further causes said processor to execute the steps of:

pushing said address pointer of said data object onto a stack of ADT pointers;

when a second address pointer of said data object is equal to an ADT pointer in said stack, pushing said second address pointer onto said stack; and converting each ADT pointer in said stack into a memory offset value in said image according to said type descriptor segment and said format descriptor object, and copying into said image a second plurality of bytes to which each said ADT pointer points.

51. A computer software product for unpickling an image into a data object that includes a medium readable by a processor, the medium having stored thereon type data describing inheritance characteristics, attributes, and an attribute character set of an abstract data type of said data object; and a sequence of instructions which, when executed by said processor, causes said processor to unpickle an image into a data object by causing said processor to execute the steps of:

allocating an area in said computer memory sufficient to store said data object;

reading a plurality of bytes from said image;

transforming said plurality of bytes into an attribute of an abstract data type of said data object according to said type data for said data object; and storing said attribute into said area.

52. The computer software product recited in claim 51, wherein said sequence of instructions further causes said processor to execute the steps of:

reading said type data from a prefix segment of said image.

53. The computer software product recited in claim 51, wherein said sequence of instructions further causes said processor to execute the steps of reading, from a table of a database system, type data describing inheritance characteristics, attributes, and an attribute character set of an abstract data type of said data object.

54. A computer software product for setting an attribute within an image of a data object to a value that includes a medium readable by a processor, the medium having stored thereon type data describing inheritance characteristics, attributes, and an attribute character set of an abstract data type of said data object; and a sequence of instructions which, when executed by said processor, causes said processor to set an attribute within an image of a data object to a value by causing said processor to execute the steps of:

reading an offset of said attribute within said image from said type data;

locating said attribute in said image according to said offset; and storing said value in said image at said offset.

55. The computer software product recited in claim 54, wherein said sequence of instructions further causes said processor to execute the steps of storing said value further comprises the step of transforming said value into a linearized byte format.

56. The computer software product recited in claim 54, wherein said sequence of instructions further causes said processor to execute the steps of:

reading said type data from a prefix segment of said image.

57. A computer apparatus for pickling a data object into an image, comprising:

a processor; and a memory coupled to said processor; the memory having stored therein a type descriptor segment describing said data object;

a format descriptor object that describes a data format used by a host computer system; and sequences of instructions which, when executed by said processor, cause said processor to pickle said data object into said image by causing the processor to perform the steps of:

copying a plurality of bytes of said data object into said image, according to information contained in said type descriptor segment; and if said data object contains a pointer, transforming an address pointer of said data object into a memory offset value in said image using said type descriptor segment and said format descriptor object, and copying into said image a second plurality of bytes to which said pointer points.

58. A computer apparatus for unpickling a data object into an image, comprising:

a processor; and a memory coupled to said processor; the memory having stored therein type data describing inheritance characteristics, attributes, and an attribute character set of an abstract data type of said data object; and sequences of instructions which, when executed by said processor, cause said processor to unpickle said data object into said image by causing the processor to perform the steps of:

allocating an area in said computer memory sufficient to store said data object;

reading a plurality of bytes from said image;

transforming said plurality of bytes into an attribute of an abstract data type of said data object according to said type data for said data object; and storing said attribute into said area.

59. A computer apparatus for setting an attribute within an image of a data object to a value, comprising:

a processor; and a memory coupled to said processor; the memory having stored therein type data describing inheritance characteristics, attributes, and an attribute character set of an abstract data type of said data object; and sequences of instructions which, when executed by said processor, cause said processor to store said value in said image of said data object by causing the processor to perform the steps of:

reading an offset of said attribute within said image from said type data;

locating said attribute in said image according to said offset; and storing said value in said image at said offset.

* * * * *

UNITED STATES PATENT AND TRADEMARK OFFICE
CERTIFICATE OF CORRECTION

PATENT NO. : 6,128,621
DATED : October 3, 2000
INVENTOR(S) : Weisz

It is certified that error appears in the above-identified patent and that said Letters Patent is hereby corrected as shown below:

<u>Title page,</u>
Item [54], Title, "APPARATUS AND METHOD FOR PICKLING DATA" should read -- METHOD AND SYSTEM FOR PICKLING DATA OBJECT INTO LINEARIZED IMAGE AND UNPICKLING LINEARIZED IMAGE INTO A DATA OBJECT --.

Signed and Sealed this

Twenty-fourth Day of August, 2004

JON W. DUDAS
*Director of the United States Patent and Trademark Office*